(12) United States Patent
Miyata

(10) Patent No.: US 9,183,451 B2
(45) Date of Patent: Nov. 10, 2015

(54) IMAGE EDITING APPARATUS AND NON-TRANSITORY COMPUTER-READABLE MEDIUM STORING PROGRAM EXECUTABLE BY IMAGE EDITING APPARATUS

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 186 days.

(21) Appl. No.: 13/761,858

(22) Filed: Feb. 7, 2013

(65) Prior Publication Data
US 2013/0208999 A1    Aug. 15, 2013

(30) Foreign Application Priority Data
Feb. 9, 2012    (JP) .................................. 2012-025695

(51) Int. Cl.
*G06K 9/03* (2006.01)
*H04N 1/387* (2006.01)

(52) U.S. Cl.
CPC ................ *G06K 9/03* (2013.01); *H04N 1/3873* (2013.01)

(58) Field of Classification Search
None
See application file for complete search history.

(56) References Cited

U.S. PATENT DOCUMENTS

| 2006/0171002 A1* | 8/2006 | Mori ............................. 358/538 |
| 2006/0212807 A1* | 9/2006 | Narusawa ..................... 715/526 |
| 2006/0215232 A1* | 9/2006 | Ziv-el ........................... 358/448 |
| 2006/0291017 A1* | 12/2006 | Moran et al. .................. 358/538 |
| 2008/0144096 A1* | 6/2008 | Kawai ........................... 358/1.15 |
| 2008/0181512 A1* | 7/2008 | Gavin et al. ................... 382/209 |
| 2008/0212132 A1* | 9/2008 | Matsumoto .................. 358/1.15 |
| 2008/0259410 A1* | 10/2008 | Saito ............................. 358/450 |

FOREIGN PATENT DOCUMENTS

| JP | 2002-163605 A | 6/2002 |
| JP | 2011-061691 A | 3/2011 |

* cited by examiner

*Primary Examiner* — Andrae S Allison
(74) *Attorney, Agent, or Firm* — Merchant & Gould PC

(57) ABSTRACT

An image editing apparatus including: an image-data obtainer which obtains: first-face and second-face image data respectively created by reading first and second faces of a document, the first-face image data being as first target data, the second-face image data being as second target data; a receiver which receives a command for executing a processing for one of the first and second target data; and an image processor which, upon receipt of the command by the receiver, executes, for the one target data, a processing based on the command and executes, for another of the first and second target data, a processing symmetrical to the processing based on the command with respect to an axis extending through a center of an image corresponding to the one target data and extending in a sub-scanning direction during reading of the document.

11 Claims, 18 Drawing Sheets

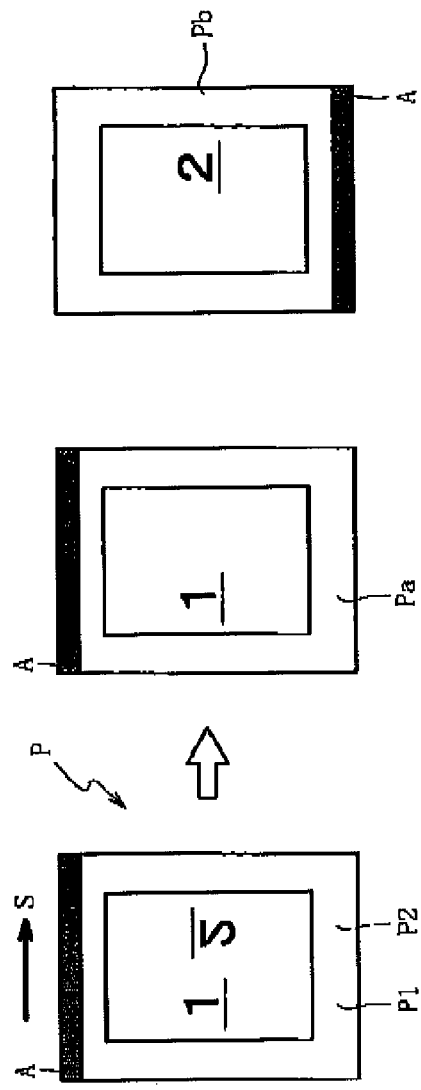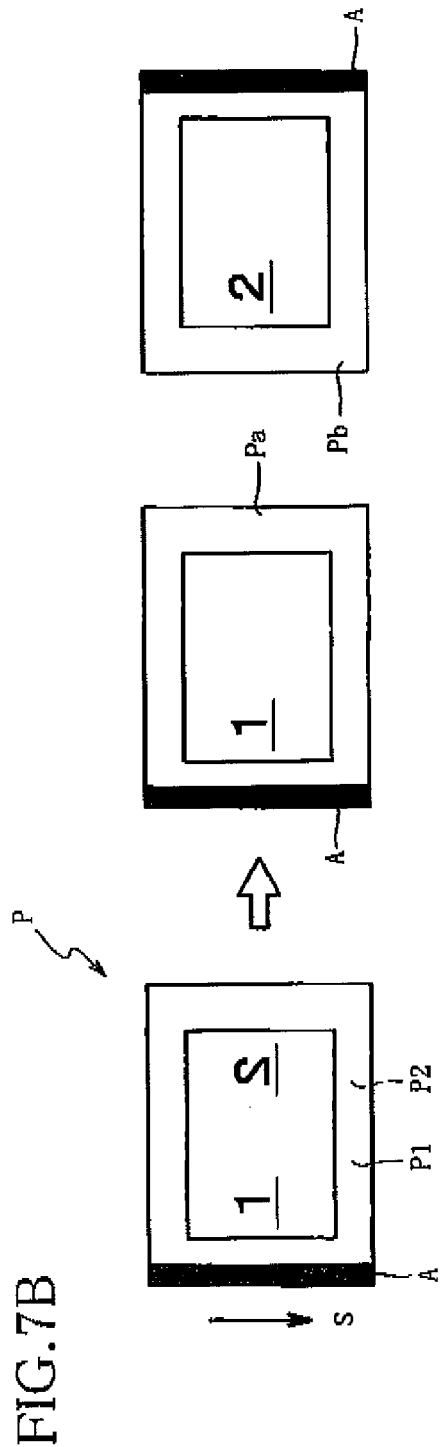

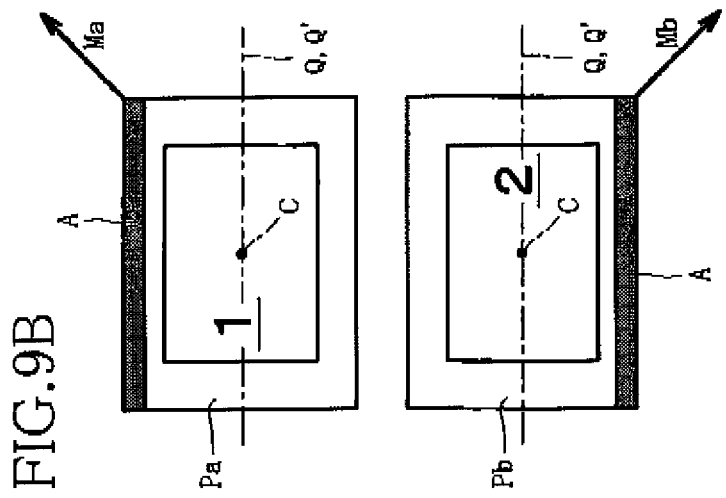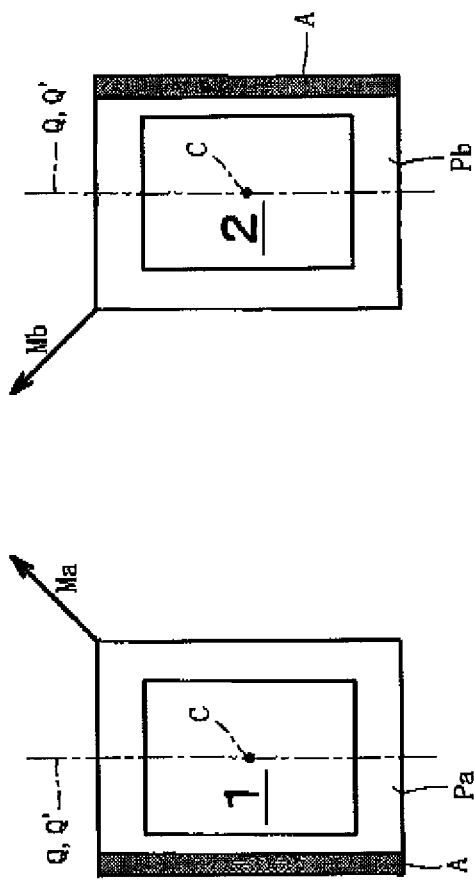

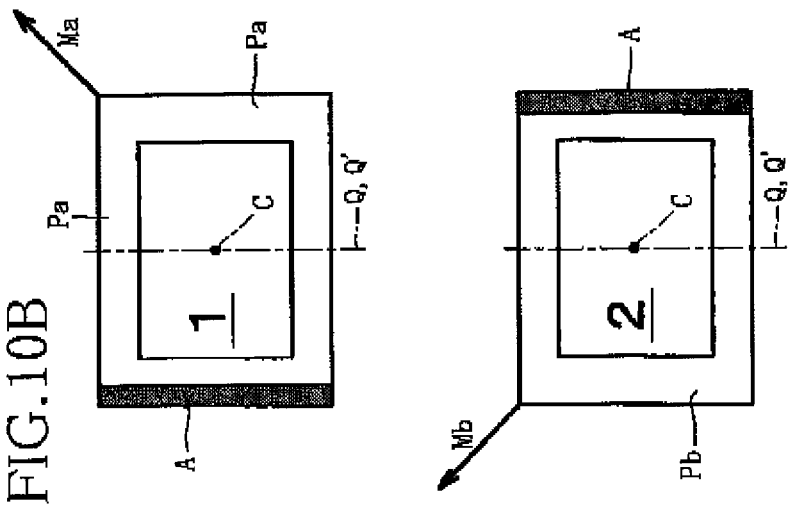
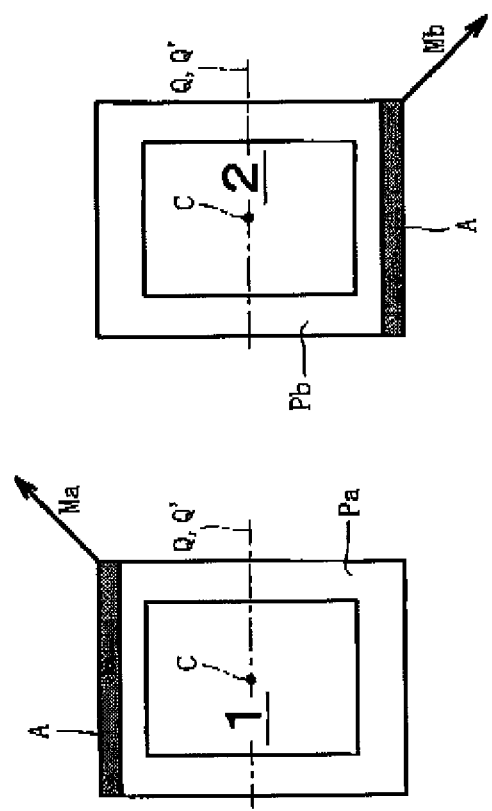
FIG.10B
FIG.10A

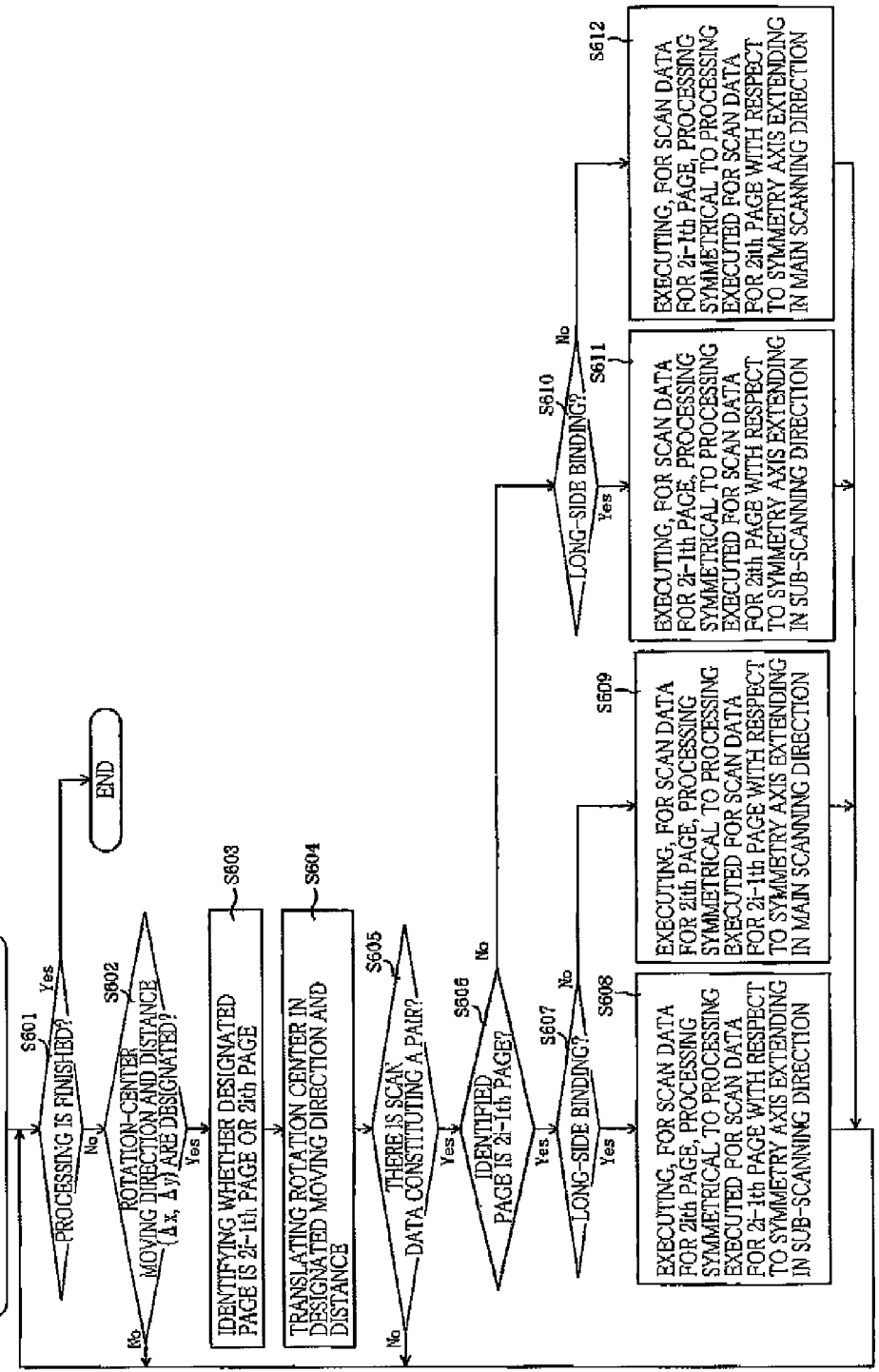

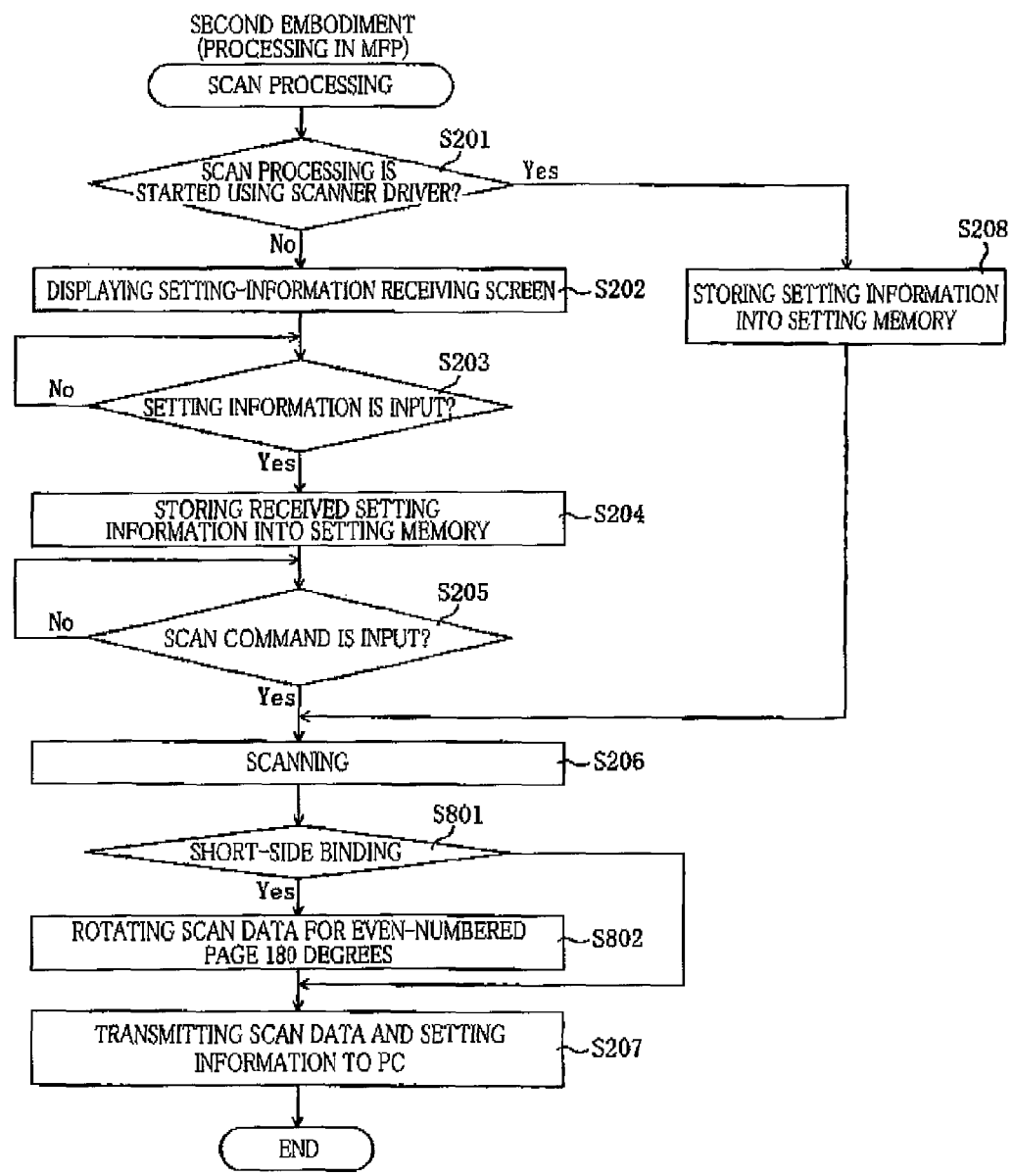

IMAGE EDITING APPARATUS AND NON-TRANSITORY COMPUTER-READABLE MEDIUM STORING PROGRAM EXECUTABLE BY IMAGE EDITING APPARATUS

CROSS REFERENCE TO RELATED APPLICATION

The present application claims priority from Japanese Patent Application No. 2012-025695, which was filed on Feb. 9, 2012, the disclosure of which is herein incorporated by reference in its entirety.

BACKGROUND OF THE INVENTION

1. Field of the Invention

The present invention relates to an image editing apparatus and a non-transitory computer-readable medium storing a program executable by a computer of the image editing apparatus.

2. Description of the Related Art

Document scanning sometimes results in acquisition of an undesired scan image such as an image with an undesired margin and an image with inclined contents. In such a case, the acquired image needs to be edited by deleting the margin from the scan image or rotating the scan image to adjust inclination of the contents.

For example, there is known a technique of correcting scanning displacement in front and back images of a slip after scanning of front and back faces of the slip. Specifically, one of the front and back faces is determined as a reference face, and edge information is detected from an image based on the reference face. On the basis of the detected edge information, positional displacement due to the scanning displacement is corrected for each of the front and back images.

SUMMARY OF THE INVENTION

In the case of two-sided scanning for one of bound documents, two scan images acquired may not be symmetrical to each other in terms of, e.g., positions of margins and rotational directions, depending upon a relationship between a binding direction of the documents and a sub-scanning direction during reading of the document. Thus, the user unfortunately needs to perform editing processings such as deletion of the margins and image rotations for the front and back scan images. Also, the editing processings for both of the front and back scan images may result in inaccurate alignment therebetween. However, the above-described conventional technique gives no consideration to such situations.

This invention has been developed to provide an image editing apparatus capable of easily and accurately editing a pair of scan images, and a non-transitory computer-readable medium storing a program executable by a computer of the image editing apparatus.

The present invention provides an image editing apparatus, comprising: an image-data obtainer configured to obtain: first-face image data that is created by reading a first face of a document; and second-face image data that is created by reading a second face of the document which is on a back of the first face, the first-face image data being as first target data, the second-face image data being as second target data; a processing-command receiver configured to receive a command for executing a processing for one of the first target data and the second target data as one target data; and an image processor configured, upon receipt of the command by the processing-command receiver, to execute, for the one target data, a processing based on the command received by the processing-command receiver and to execute, for another of the first target data and the second target data as an other target data, a symmetrical processing that is symmetrical to the processing based on the command received by the processing-command receiver with respect to a symmetry axis that is an axis extending through a center of an image corresponding to the one target data and extending in a sub-scanning direction during reading of the document for the creation of the first-face image data and the second-face image data.

The present invention also provides a non-transitory computer-readable medium storing a program executable by a computer of an, image editing apparatus, the program designed to cause the computer function as: an image-data obtainer configured to obtain: first-face image data that is created by reading a first face of a document; and second-face image data that is created by reading a second face of the document which is on a back of the first face, the first-face image data being as first target data, the second-face image data being as second target data; a processing-command receiver configured to receive a command for executing a processing for one of the first target data and the second target data as one target data; and an image processor configured, upon receipt of the command by the processing-command receiver, to execute, for the one target data, a processing based on the command received by the processing-command receiver and to execute, for another of the first target data and the second target data as an other target data, a symmetrical processing that is symmetrical to the processing based on the command received by the processing-command receiver with respect to a symmetry axis that is an axis extending through a center of an image corresponding to the one target data and extending in a sub-scanning direction during reading of the document for the creation of the first-face image data and the second-face image data.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIGS. 7A and 7B are schematic views each illustrating a pair of front and back scan images that are obtained when the document whose binding direction extends along the short-side binding is conveyed in the short-side extending direction and scanned;

FIGS. 9A and 9B axe schematic views each for explaining symmetry of processing when an image moving processing is executed for the pair of front and back scan images;

FIGS. 10A and 10B are schematic views each for explaining symmetry of processing when the image moving processing is executed for the pair of front and back scan images;

FIG. 16 is a flow chart illustrating a rotation-center moving processing executed in the scan-data editing processing;

FIG. 18 is a flow chart illustrating a scan processing in a second embodiment.

DETAILED DESCRIPTION OF THE EMBODIMENTS

Figure 1:
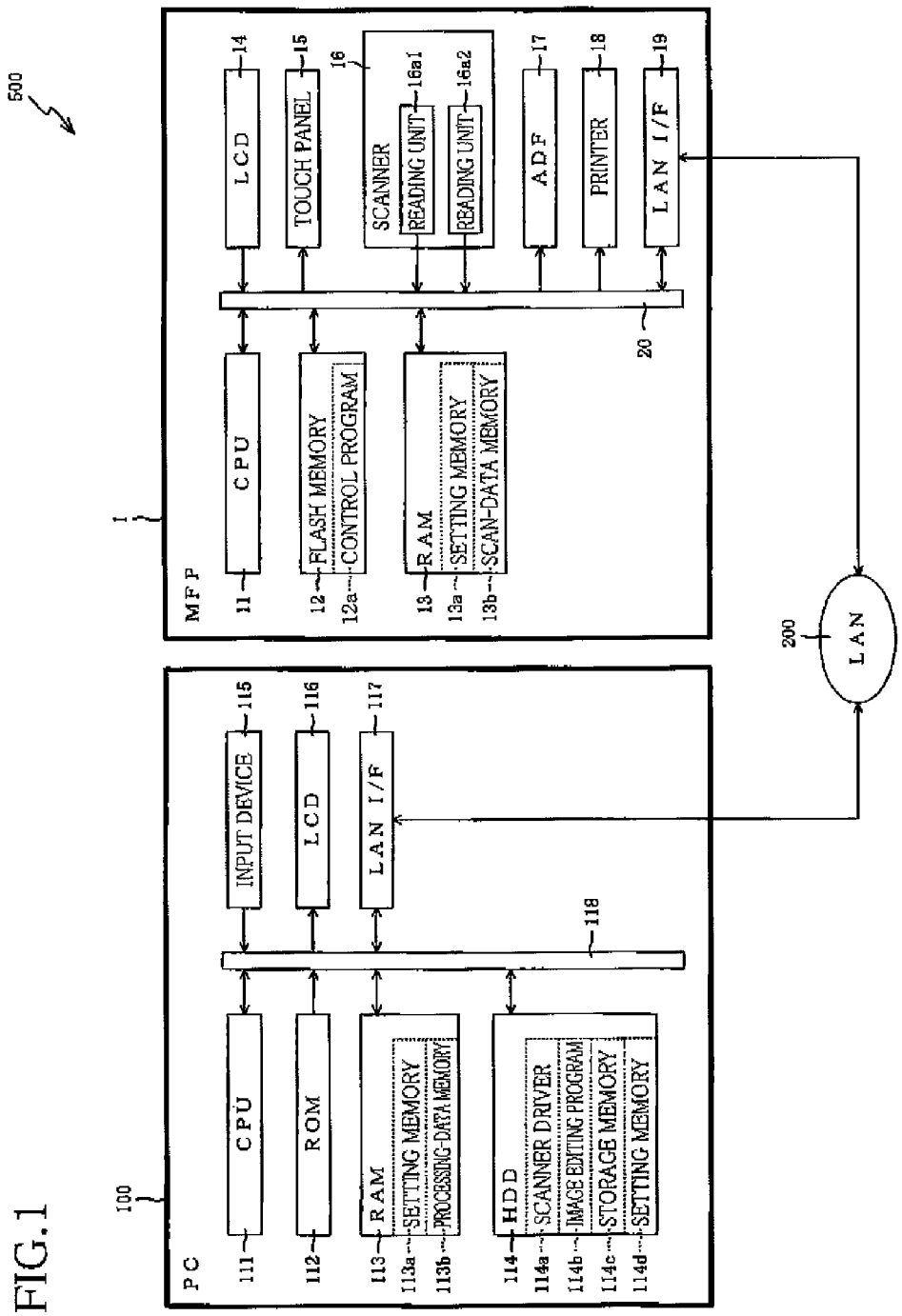
FIG. 1 is a block diagram illustrating a structure of an image editing system, according to one embodiment of the present invention, that includes: a PC on which a control program is installed; and an MFP 1 coupled to the PC.

Hereinafter, there will be described embodiments of the present invention by reference to the drawings. First, a first embodiment will be explained with reference to FIGS. 1-17. As illustrated in FIG. 1, an image editing system 500 according to one embodiment of the present invention includes: a personal computer (PC) 100 on which is installed an image editing program 114b; and a multifunction peripheral (MFP) coupled to the PC 100.

As will be explained later in detail, in a case where image data obtained by scanning and received from the MFP 1 (hereinafter referred to as "scan data") is scan data obtained by scanning of a two-sided document and where a binding direction is designated or specified for the received scan data, when execution of a processing is commanded for one of a pair of scan data obtained from a front face of a single two-sided document and scan data obtained from a back face of the single two-sided document, the image editing program 114b in the present embodiment can cause an appropriate processing for the other of the pair of scan data on the basis of the command supplied for the one of the pair of scan data. It is noted that the binding direction is a direction along which sides of documents extend when the documents are bound at the sides.

The PC 100 includes a CPU 111, a ROM 112, a RAM 113, a hard disc drive (HDD) 114, an input device 115, an LCD 116, and a LAN interface (LANI/F) 117. These devices 111-117 are coupled to one another by a bus line 118.

The CPU 111 controls these devices according to programs stored in the ROM 112 and the HDD 114. The ROM 112 is an unrewritable non-transitory memory that stores various data including a control program for controlling operations of the PC 100.

The RAM 113 is a rewritable transitory memory that includes a setting memory 113a and a processing-data memory 113b. The setting memory 113a is a memory area or a storage area that stores setting information received from the MFP 1 with the scan data. It is noted that the setting information includes: sheet size information about the sheet size of a document to be scanned; and binding information about a binding setting. In the present embodiment, the binding setting includes: "long-side binding" in which the document to be scanned is bound along its long side, in other words, a direction in which the long side of the document extends coincides with the binding direction of the document; "short-side binding" in which the document to be scanned is bound along its short side, in other words, a direction in which the short side of the document extends coincides with the binding direction of the document; and "no binding" in which the document to be scanned is not bound, in other words, no setting is provided for the binding direction. One of these three binding settings is designated by a user when a two-sided document is scanned by a scanner 16 of the MFP 1. The setting information including the binding setting is set on the PC 100 using a user interface of a scanner driver 114a which is displayed on the LCD 116 or set on the MFP 1 using a setting screen that is displayed on an LCD 14 when a scanning function is performed. The processing-data memory 113b is a memory area that stores scan data to be processed which is received from the MFP 1. The scan data stored in the processing-data memory 113b is processed according to the image editing program 114b.

The HDD 114 is a rewritable non-transitory storage device that stores the seamier driver 114a and the image editing program 114b and includes a storage memory 114c and a setting memory 114d. The scanner driver 114a is a program for controlling the scanner 16 of the MFP 1 from the PC 100. The PC 100 can send the MFP 1 a scan, command, i.e., a command for scan in an image, using the scanner driver 114a to receive, from the MFP 1, scan data obtained by the scanner 16.

The image editing program 114b is a program for controlling the CPU 111 to execute a processing related to the scan data received by the PC 100 from the MFP 1, i.e., image data representative of the document scanned by the scanner 16. The image editing program 114b is started when the PC 100 receives the scan data from the MFP 1 or when the start of the image editing program 114b is commanded by designation of the scan data stored in the storage memory 114c. It is noted that the PC 100 receives the scan data from the MFP 1 when the scan command is supplied using the scanner driver 114a or when the user inputs the scan command by selecting the scanning function on the 114b. The CPU 111 of the PC 100 executes processings indicated by flow charts in FIGS. 13-17 which will be described below, according to the image editing program 114b. The CPU 111 also performs image editing for the scan data received from the MFP 1 and the scan data stored in the storage memory 114c. The image editing program 114b is obtained from, e.g., an external sever, not shown, connectable to the PC 100 via an Internet or a storage medium such as a compact disc, then stored into the HDD 114, and set or installed in response to an install request from the user so as to be available in the PC 100.

The storage memory 114c is a memory area that stores scan data processed according to the image editing program 114b, i.e., the scan data stored in the processing-data memory 113b. The setting memory 114d is a memory area that stores the setting information for the scan data to be stored into the storage memory 114c. When the scan data stored in the processing-data memory 113b is stored into the storage memory 114c, the setting information corresponding to the scan data and stored in the setting memory 113a is also stored into the setting memory 114d so as to be assigned to the scan data to be stored into the storage memory 114c.

The input device 115 includes various devices such as a keyboard and a mouse provided for the user to input various commands and information to the PC 100. The LCD 116 is a liquid crystal display. The LANI/F 117 is an interface that is connected to a local area network (LAN) 200. When the LANI/F 117 is connected to the LAN 200, the PC 100 is communicably coupled to other devices via the LAN 200. In the present embodiment, as illustrated in FIG. 1, the PC 100 is coupled to the MFP 1 via the LAN 200.

The MFP 1 is a multifunction peripheral having a plurality of functions such as the scanning function, a copying function, and a printing function. The MFP 1 includes a CPU 11, a flash memory 12, a RAM 13, the LCD 14, a touch panel 15, the scanner 16, an auto document feeder (ADF) 17, a printer 18, and a LANI/F 19. These devices 11-19 are coupled to one another by a bus line 20.

The CPU 11 controls the various functions of the MFP 1 according to fixed values and programs stored in the flash memory 12 and data stored in the RAM 13. The flash memory 12 is a non-transitory memory that stores various data and programs such as a control program 12a for controlling operations of the MFP 1. Processings indicated by a flow chart in FIG. 12 which will be described below are executed by the CPU 11 according to the control program 12a.

The RAM 13 is a rewritable transitory memory that temporarily stores information required for processings of the CPU 11. The RAM 13 includes a setting memory 13a and a scan-data memory 13b. The setting memory 13a is a memory area that stores the setting information when the document is scanned. The setting information stored in the setting memory 13a includes the sheet size information and the binding information. When a document is scanned using the scanner driver 114a on the basis of the scan command, the setting information contained in the scan command is stored in the setting memory 13a. On the other hand, when the user operates the MFP 1 to select the execution of the scanning function, and the document is scanned in response to this user's operation, the user designates setting information by using the setting screen displayed on the LCD 14 after the selection of the execution of the scanning function, and the designated setting information is stored into the setting memory 13a. The scan-data memory 13b is a memory area that stores the scan data obtained by the scanner 16.

The LCD 14 is a liquid crystal display. The touch panel 15 is overlaid on the LCD 14 to receive input of the setting information and various commands to the MFP 1. The printer 18 is for printing an image on a recording sheet. The ADF 17 is an automatic conveyor mechanism designed to convey a document along a conveyance path, not shown, from a document tray, not shown, to the scanner 16 and discharge the document after the scanning.

The scanner 16 is designed to scan the document and output scan data to the CPU 11. The scanner 16 includes two reading units 16a1, 16a2 each as one example of an imaging device.

Each of these reading units 16a1, 16a2 includes a contact image sensor (CIS) and a light source such as an LED. The reading unit 16a1 and the reading unit 16a2 are arranged along a main scanning direction (that is a direction along a document face and perpendicular to a document conveying direction in which the document is conveyed) such that the CISs are opposed to each other with the conveyance path, not shown, therebetween. In the reading unit 16a1, the light source emits light to one face, e.g., a front face, of the document conveyed by the ADF 17 through the conveyance path, and the CIS receives its reflected light, whereby the reading unit 16a1 reads the one face of the two-sided document one line by one line. In the reading unit 16a2, on the other hand, the light source emits light to the other face, e.g., a back face, of the document conveyed by the ADF 17 through the conveyance path, and the CIS receives its reflected light, whereby the reading unit 16a2 reads the other face of the two-sided document one line by one line.

Figure 2:
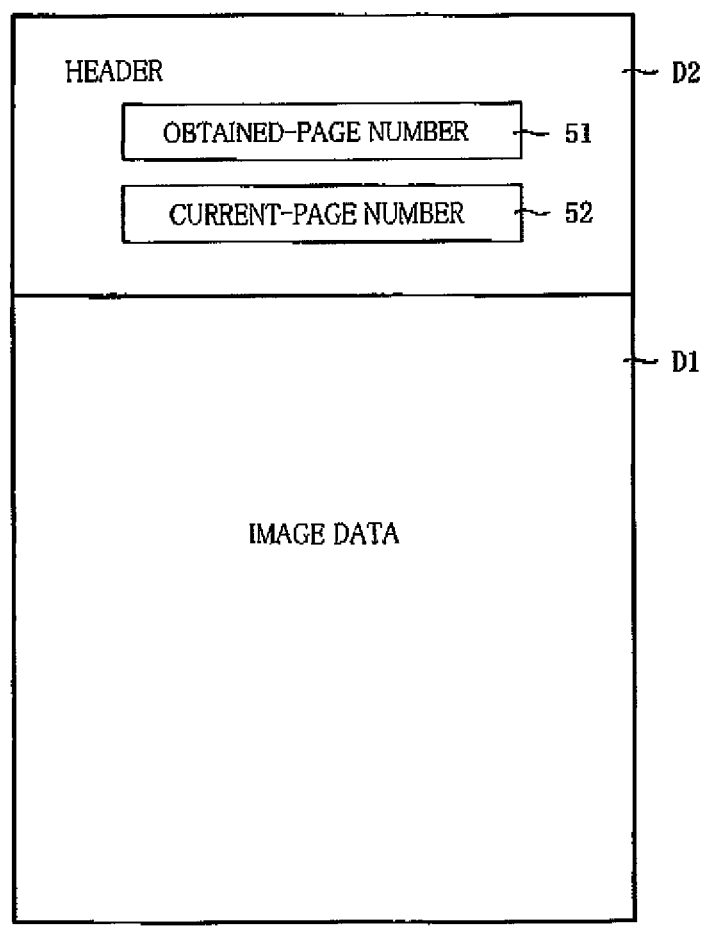
FIG. 2 is a view illustrating one example of a data structure of scan data created when a two-sided document is scanned.

As illustrated in FIG. 2, the scan data obtained by the scanning of the two-sided document is constituted by: an image data area D1 that stores image data representative of an image, i.e., a scan image, of the read document and a header area D2 that stores additional information. The additional information includes an obtained-page number 51 and a current-page number 52 of each of the scan data obtained by the scanning of the two-sided document.

The obtained-page number 51 is a value that represents an ordinal number of acquisition of the image data, i.e., an ordinal number of reading of the document by the scanner 16. Specifically, sequential numbers (i.e., ordinal numbers or the obtained-page numbers 51) are respectively assigned to a plurality of image data in order of acquisition thereof. In the present embodiment, the obtained-page number 51 is incremented by one each time when each of front and back faces of the two-sided document is read. In addition, sequential numbers are respectively assigned to scan data representative of the reference face of the two-sided document, e.g., the front face read by the CIS 16a1, and scan data representative of a back face of the document on the back of the reference face, e.g., the back face read by the CIS 16a2, and an odd number of the sequential numbers is assigned to the scan data representative of the reference face while an even number of the sequential numbers is assigned to the scan data representative of the back face of the document on the back of the reference face. Specifically, assuming that the page number of the two-sided document scanned by the scanner 16 is i (i is an integer equal to or greater than one), the obtained-page number 51 of the scan data representative of the reference face of the two-sided document is represented as 2i−1, and the obtained-page number 51 of the scan data representative of the back face is represented as 2i.

On the other hand, the current page number 52 is a value that represents an actual page number of one of sequential scan data obtained by the scanning of the two-sided document. Upon creation of the scan data, the obtained-page number(s) 51 and the current-page number(s) 52 are the same as each other. That is, when the two-sided document of ith page is read by the scanner 16, 2i−1 is assigned to the scan data representative of the reference face, and 2i is assigned to the scan data representative of the back face. When the user thereafter deletes certain scan data upon editing the scan data on the PC 100, each of the current-page numbers 52 following the current-page number 52 of the deleted scan data is decreased according to the number of deleted pages.

The obtained-page number 51 and the current-page number 52 are stored in the header area D2 of the scan data in this manner. Thus, even when the user deletes some of the sequential scan data obtained by the scanning of the two-sided document, it is possible to maintain a relationship of the pair of scan data representative of the respective front and back faces of the single two-sided document.

Figure 3A:
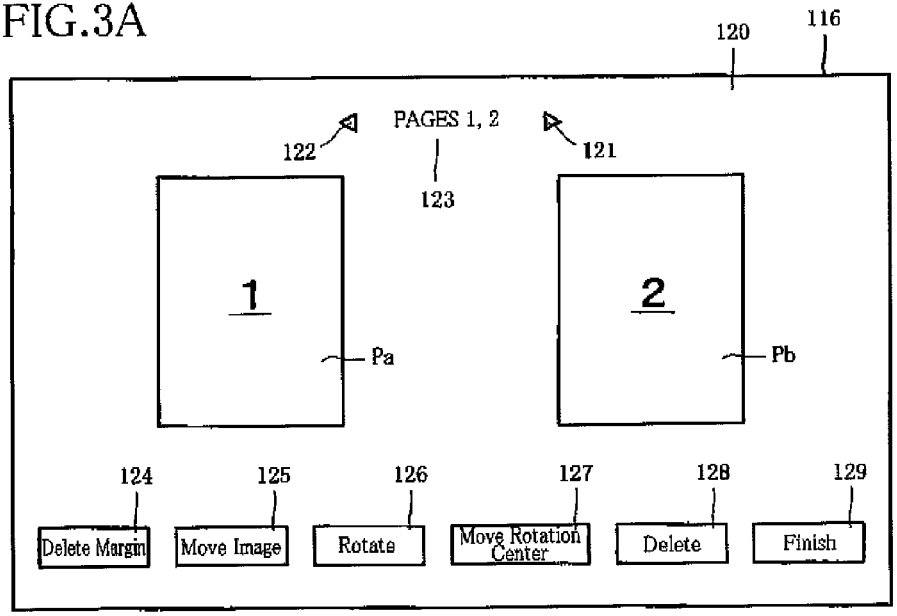
FIGS. 3A and 3B are schematic views respectively illustrating edit screens that are displayed on an LCD in a case where a binding direction is designated for scan data.
Figure 3B:
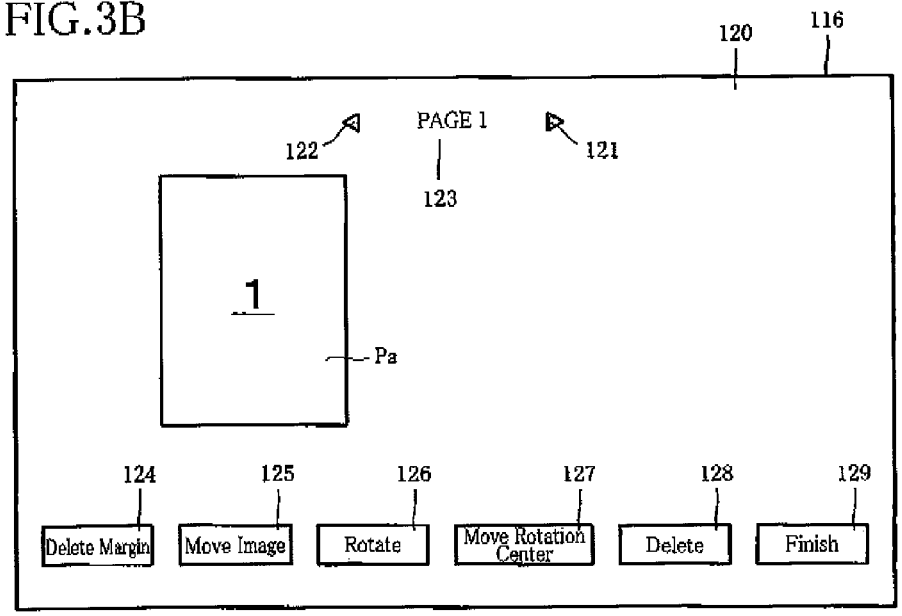

Each of FIGS. 3A and 3B illustrates an edit screen 120 displayed on the LCD 116 when the binding direction is designated for the scan data received by the PC 100.

FIG. 3A is a view illustrating the edit screen 120 in a case where there are a pair of front and back scan data respectively representative of a pair of front and back faces of the single two-sided document. When both of the pair of front and back scan data are present, a scan image Pa and a scan image Pb are arranged on the edit screen 120 so as to be next to each other. The scan image Pa is based on scan data representative of the front face of the document, and the scan image Pb is based on scan data representative of the back face of the document. It is noted that the number may be described on each of the scan images Pa, Pb in FIGS. 3-11, in which "1" represents scan data representative of a front face of a single document, and "2" represents scan data representative of a back face of the single document. Also, the underline in each image indicates a lower side of the scan image when the user facing the scan image views the scan image so as to correctly recognize the contents of the front face in its up and down direction.

In addition to the scan images Pa, Pb, the edit screen 120 contains a page forward button 121, a page backward button 122, a displayed page number 123, a Delete Margin button 124, a Move Image button 125, a Rotate button 126, a Move Rotation Center button 127, a Delete button 128, and a Finish button 129.

The page forward button 121, when operated, causes the CPU 11 to change the scan images to be displayed to scan images of a document of the next page. The page backward button 122, when operated, causes the CPU 11 to change the scan images to be displayed to scan images of a document of the preceding page. The displayed page number 123 is the current-page number, i.e., the current-page number 52, of the scan image being displayed. When the user operates the page forward button 121 or the page backward button 122 using the input device 115, the scan images displayed on the edit screen are updated or changed to the scan images of the document of the preceding or next page according to the operated one of the buttons 121, 122. With the update of the scan images, the displayed page numbers 123 are also updated to the page numbers of the scan images being displayed.

Each of the Delete Margin button 124, the Move Image button 125, the Rotate button 126, and the Move Rotation Center button 127 causes the CPU 11 to execute a corresponding one of processings for the scan images being displayed. Specifically, the Delete Margin button 124 is for designating a margin deleting or trimming processing to delete margins from the scan images being displayed. The Move Image button 125 is for designating an image moving processing to translate the scan images being displayed, in other words, the image moving processing is for causing a parallel movement of the scan images being displayed. The Rotate button 126 is for designating a rotating processing to rotate the scan images being displayed. The Move Rotation Center button 127 is for designating a rotation-center moving processing to move rotation centers that are determined when the scan images being displayed are rotated. When one of these buttons 124-127 is operated using the input device 115, a corresponding one of the processings can be performed. For example, when the Delete Margin button 124 is operated, it becomes possible to designate a deletion area for the scan image being displayed.

The Delete button 128, when operated, causes the CPU 11 to delete the scan image being displayed. When the user operates the Delete button 128 using the input device 115 and then designates the scan image to be deleted, the designated scan image is deleted. The Finish button 129, when operated, causes the CPU 11 to finish the image editing according to the image editing program 114b. When the user operates the Finish button 129 using the input device 115, the CPU 11 stores the scan data being edited and finishes the execution of the image editing program 114b.

As will be described later in detail, in the present embodiment, when the margin deleting processing, the image moving processing, the rotating processing, or the rotation-center moving processing is commanded for one scan image of the pair of front and back scan images Pa, Pb displayed on the edit screen 120, the CPU 11 executes the commanded processing for the one scan image and executes a processing for the other of the scan images, which processing is symmetrical to the commanded processing with respect to a symmetry axis that is determined by the binding direction and the document conveying direction (in other words, the processing for the other of the scan images is obtained by flipping the commanded processing with respect to the symmetry axis). Thus, the scan images of a pair of the front and back faces can be easily and accurately edited even in a situation where the binding direction is set, and symmetry of processings executed respectively for the pair of scan data changes depending upon the document conveying direction.

FIG. 3B is a view illustrating the edit screen 120 in a case where one of the pair of front and back scan data has been deleted. In the case where one of the pair of front and back scan data has been deleted, the image editing program 114b causes the CPU 11 to display only one scan image corresponding to the present or remaining scan data. In the example in FIG. 3A, only the scan image Pa (the scan image based on the front face of the document) is displayed on the edit screen 120. This display indicates that the scan image Pb based on the hack face has been deleted among a pair of the scan image Pa and the scan image Pb.

In a case where a processing is executed for one of two scan images that are based of different documents, and the other scan image is processed on the basis of the processing executed for the one scan image, an inappropriate processing possibly executed for the other scan image. However, in the present embodiment, when certain scan data is deleted, the two scan images based of different documents are not displayed on the edit screen 120. Thus, the two scan images based of different documents are not to be processed as a pair, preventing an inappropriate processing for the scan image.

Also, as illustrated in FIG. 3A, the scan images Pa, Pb are displayed on the edit screen 120 such that upper portions of the scan images Pa, Pb are located nearer to the upper side of the screen, i.e., the upper side of the sheet face, than lower portions thereof. Thus, the user can easily perform the editing operation for the scan images Pa, Pb.

There will be next explained, with reference to FIGS. 4-7, orientations of the pair of front and back scan images in a case where the two-sided document is read by the scanner 16. The orientations of the pair of front and back scan images depend upon the document conveying direction and the binding direction set for the two-sided document.

Figure 4A:
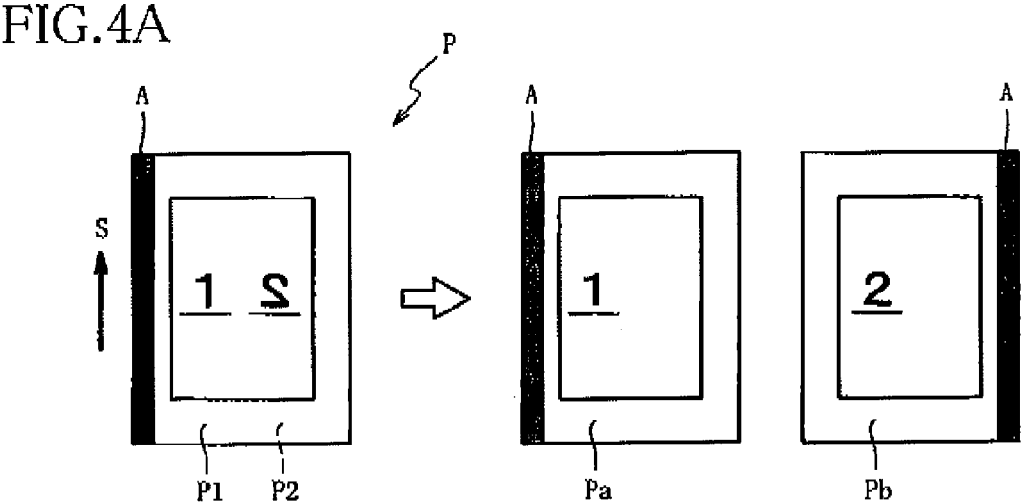
FIGS. 4A and 4B are schematic views each illustrating a pair of front and back scan images that are obtained when a document whose binding direction extends along a long-side binding is conveyed in a long-side extending direction and scanned.
Figure 4B:
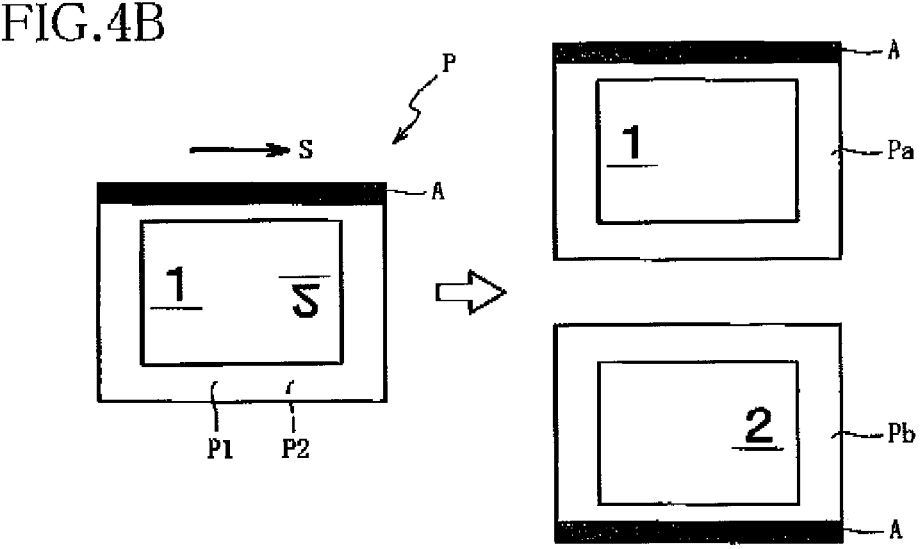

FIG. 4A is a view in a case where the document P is a portrait document in which a top side is one of the shorter sides, and FIG. 4B is a view in a case where the document P is a landscape document hi which a top side is one of the longer sides.

As illustrated in a left portion in FIG. 4A, in a case where the binding direction is set as the long-side extending direction for the portrait document P, a binding position (i.e., a binding side) A is located at a left long side portion of a front face P1 of the document P when the user views the front face P1 from the front-face side of the document P so as to correctly recognize the contents of the front face P1 in its up and down direction. It is noted that in FIGS. 4-11, "1" described in the document P represents the front face of the document P. Correct display of "1" in the up and down direction and a right and left direction (that is, "1" is not the mirror image) represents that the front face is viewed by the user from the front-face side. The underline indicates a lower side of the document P when the user facing the scan image views the scan image so as to correctly recognize the contents of the front face in its up and down direction. Also, the binding position A is illustrated as a black rectangular area in FIGS. 4-11 for the purpose of easy understanding of positional relationship between the binding position A and the document P.

In the case where the binding direction is set as the long-side extending direction for the portrait document P, the binding position A is located at a right long side portion of a back face P2 of the document P when the user views the back face P2 from the back-face side of the document P so as to correctly recognize the contents of the back face P2 in its up and down direction. It is noted that in FIGS. 4-11, "2" described in the document P represents the back face of the document P, and the underline indicates a lower side of each of the faces P1, P2 when the user views each of the faces P1, P2 of the document P so as to correctly recognize the contents of each of the faces P1, P2 in its up and down direction. Also, the left portion in FIG. 4A illustrates the document P in the case where the user views the front face P1 from the front-face side of the document P. Since the back face P2 is on the back of the sheet face, "2" representing the back face P2 is illustrated as a mirror image. Also in the following drawings, "2" representing the back face P2 is illustrated as a mirror image when illustrating the case where the front face P1 is viewed by the user from the front-face side of the document P.

In a case where the portrait document P whose binding direction is set as the long-side extending direction is scanned while conveyed in a direction along the long side of the document P (i.e., a direction indicated by arrow S) from a lower side of the front face P1 of the document P, as illustrated in a right portion in FIG. 4A, the up and down direction of the contents of the front-face scan image Pa based on the front face P1 of the document P coincides with the up and down direction of the contents of the back-face scan image Pb based on the back face P2 of the document P.

As illustrated in a left portion in FIG. 4B, in a case where the binding direction is set as the long-side extending direction for the landscape document P, the binding position A is located at an upper long side portion of a front face P1 of the document P when the user views the front face P1 from the front-face side of the document P so as to correctly recognize the contents of the front page P1 in its up and down direction. For a back face P2 of the document P, in contrast, in the case where the binding direction is set as the long-side extending direction for the landscape document P, the binding position A is located at a lower long side portion of the back face P2 of the document P when the user views the back face P2 from the back-face side of the document P so as to correctly recognize the contents of the back face P2 in its up and down direction.

In a case where the landscape document P whose binding direction is set as the long-side extending direction is scanned while conveyed in a direction along the long side of the document P (i.e., a direction indicated by arrow S) from a left side of the front face P1 of the document P, as illustrated in a right portion in FIG. 4B, the up and down direction of the contents of the front-face scan image Pa based on the front face P1 of the document P coincides with the up and down direction of the contents of the back-face scan image Pb based on the back face P2 of the document P.

Figure 5A:
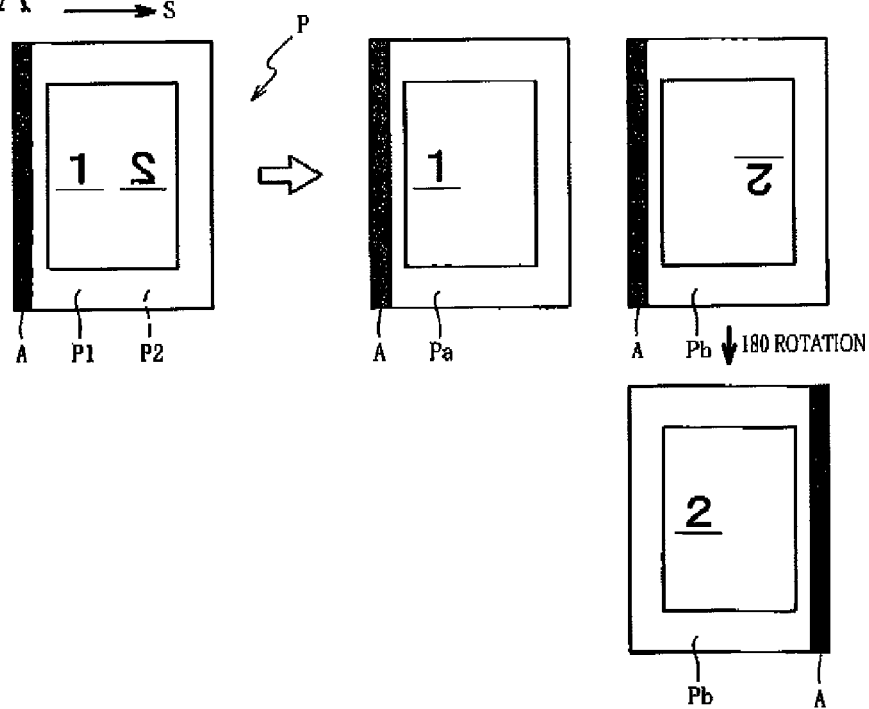
FIGS. 5A and 5B are schematic views each illustrating a pair of front and back scan images that are obtained when the document whose binding direction extends along the long-side binding is conveyed in a short-side extending direction and scanned.
Figure 5B:
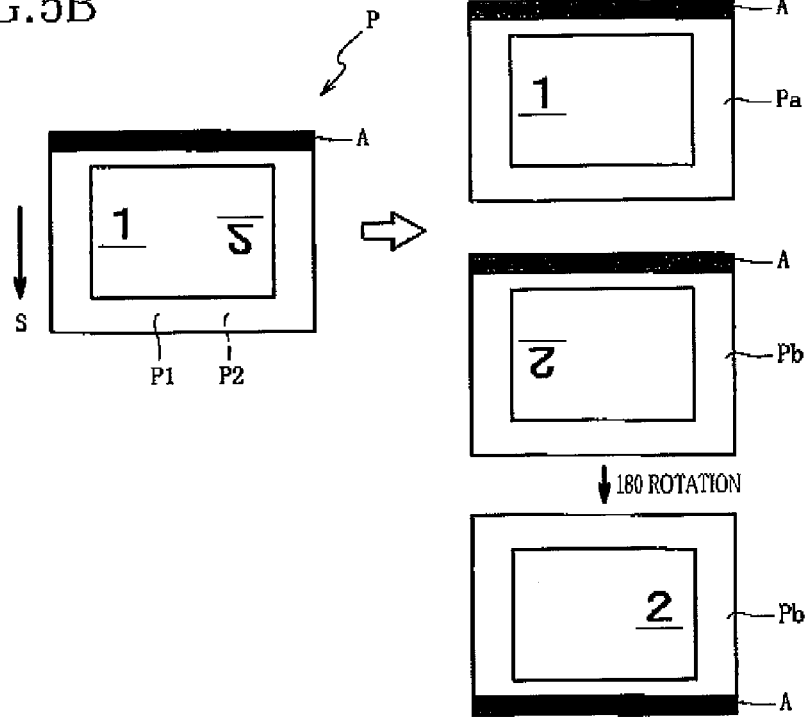

FIG. 5A is a view in a ease where the document P is a portrait document, and FIG. 5B is a view in a case where the document P is a landscape document.

As illustrated in a left portion in FIG. 5A, in a case where the portrait document P whose binding direction is set as the long-side extending direction is scanned while conveyed in a direction along the short side of the document P (i.e., a direction indicated by arrow S) from a left side of the front face P1 (i.e., from a side on which the binding position A is located), as illustrated in a right portion in FIG. 5A, the up and down direction of the contents of the back-face scan image Pb based on the back face P2 of the document P is opposite the up and down direction of the contents of the front-face scan image Pa based on the front face P1 of the document P.

As illustrated in a left portion in FIG. 5B, in a case where the landscape document P whose binding direction is set as the long-side extending direction is scanned while conveyed in a direction along the short side of the document P (i.e., a direction indicated by arrow S) from an upper side of the front face P1 (i.e., from a side on which the binding position A is located), as illustrated in a right portion hi FIG. 5B, the up and down direction of the contents of the back-face scan image Pb based on the back face P2 of the document P is opposite the up and down direction of the contents of the front-face scan image Pa based on the front face P1 of the document P.

The image editing program 114b in the present embodiment is designed, when the document P whose binding direction extends along the long-side binding is scanned while conveyed in the short-side extending direction, to cause the CPU 11 to execute a processing of rotating the scan data representative of the scan image Pb based on the back face P2 180 degrees (i.e., the processing of making a half rotation of the scan data representative of the scan image Pb based on the back face P2). As a result, the scan images Pa, Pb can be displayed on the edit screen 120 such that the up and down direction of the contents of the scan image Pa and the up and down direction of the contents of the scan image Pb coincide with each other.

Figure 6A:
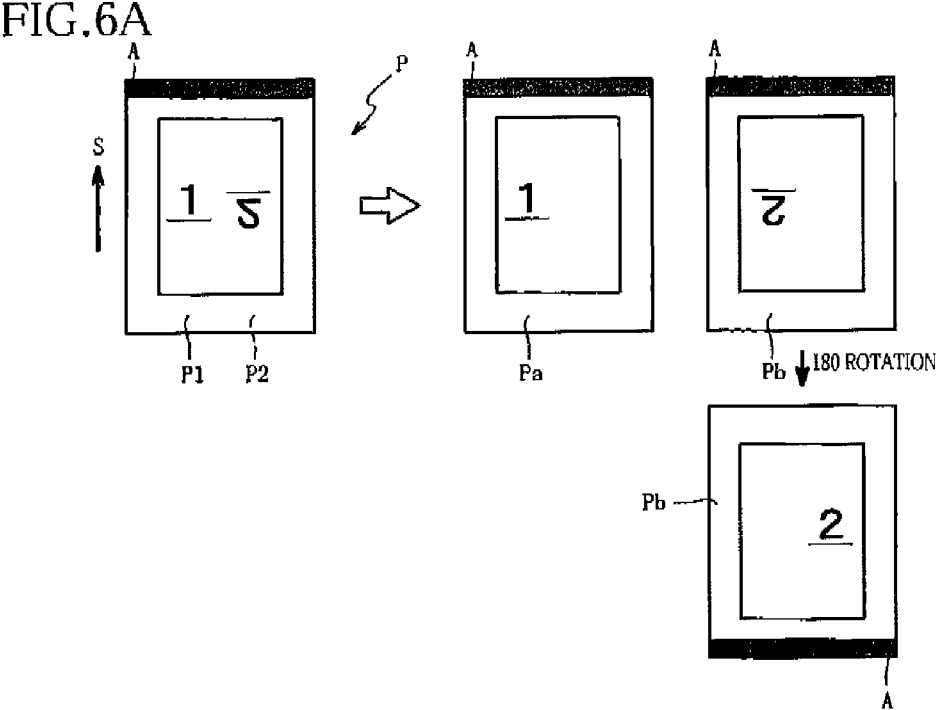
FIGS. 6A and 6B are schematic views each illustrating a pair of front and back scan images that are obtained when a document whose binding direction extends along a short-side binding is conveyed in the long-side extending direction and scanned.
Figure 6B:
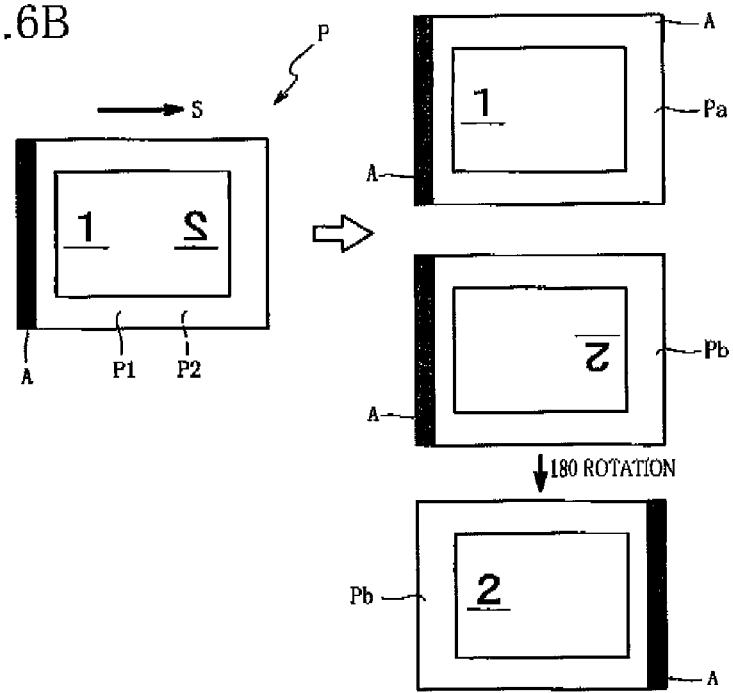

FIG. 6A is a view in a case where the document P is a portrait document, and FIG. 6B is a view in a case where the document P is a landscape document.

As illustrated in a left portion in FIG. 6A, in a case where the binding direction is set as the short-side extending direction for the portrait document P, the binding position A is located at an upper short side portion of a front face P1 of the document P when the user views the front face P1 from the front-face side of the document P so as to correctly recognize the contents of the front face P1 in its up and down direction. For a back face P2 of the document P, in contrast, in the case where the binding direction is set as the short-side extending direction for the portrait document P, the binding position A is located at a lower short side portion of the back face P2 of the document P when the user views the back face P2 from the back-face side of the document P so as to correctly recognize the contents of the back face P2 in its up and down direction.

In a case where the portrait document P whose binding direction is set as the short-side extending direction is scanned while conveyed in a direction along the long side of the document P (i.e., a direction indicated by arrow S) from a lower side of the front face P1 of the document P, as illustrated in a right portion in FIG. 6A, the up and down direction of the contents of the back-face scan image Pb based on the back face P2 of the document P is opposite the up and down direction of the contents of the front-face scan image Pa based on the front face P1 of the document P.

As illustrated in a left portion in FIG. 6B, in a case where the binding direction is set as the short-side extending direction for the landscape document P, the binding position A is located at a left short side portion of a front face P1 of the document P when the user views the front face P1 from the front-face side of the document P so as to correctly recognize the contents of the front face P1 in its up and down direction. For a back face P2 of the document P, in contrast, in the case where the binding direction is set as the short-side extending direction for the landscape document P, the binding position A is located at a right short side portion of the back face P2 of the document P when the user views the back face P2 from the back-face side of the document P so as to correctly recognize the contents of the back face P2 in its up and down direction.

In a case where the landscape document P whose binding direction is set as the short-side extending direction is scanned while conveyed in a direction along the long side of the document P (i.e., a direction indicated by arrow S) from a left side of the front face P1 of the document P (i.e., from a side on which the binding position A is located), as illustrated in a right portion in FIG. 6B, the up and down direction of the contents of the back-face scan image Pb based on the back face P2 of the document P is opposite the up and down direction of the contents of the front-face scan image Pa based on the front face P1 of the document P.

The image editing program 114b in the present embodiment is designed, when the document P whose binding direction extends along the long-side binding is scanned while conveyed in the long-side extending direction, to cause the CPU 11 to execute the processing of rotating the scan data representative of the scan image Pb based on the back face P2 180 degrees (i.e., the processing of making a half rotation of the scan data representative of the scan image Pb based on the back face P2). As a result, the scan images Pa, Pb can be displayed on the edit screen 120 such that the up and down direction of the contents of the scan image Pa and the up and down direction of the contents of the scan image Pb coincide with each other.

FIG. 7A is a view in a case where the document P is a portrait document, and FIG. 7B is a view in a case where the document P is a landscape document.

As illustrated in a left portion in FIG. 7A, in a case where the portrait document P whose binding direction is set as the short-side extending direction is scanned while conveyed in a direction along the short side of the document P (i.e., a direction indicated by arrow S) from a left side of the front face P1, as illustrated in a right portion in FIG. 7A, the up and down direction of the contents of the front-face scan image Pa based on the front face P1 of the document P coincides with the up and down direction of the contents of the back-face scan image Pb based on the back face P2 of the document P.

As illustrated in a left portion in FIG. 7B, in a case where the landscape document P whose binding direction is set as the short-side extending direction is scanned while conveyed in a direction along the short side of the document P (i.e., a direction indicated by arrow S) from an, upper side of the front face P1, as illustrated in a right portion in FIG. 7B, the up and down direction of the contents of the front-face scan image Pa based on the front face P1 of the document P coincides with the up and down direction of the contents of the back-face scan image Pb based on the back face P2 of the document P.

According to the cases in FIGS. 4-7, in each of the cases where the document P is a portrait document and where the document P is a landscape document, when the document conveying direction (i.e., the direction indicated by arrow S in FIGS. 4-7) coincides with a direction along the set binding direction, the scan images Pa, Pb are displayed on the edit screen 120 such that the up and down direction of the contents of the scan image Pa and the up and down direction of the contents of the scan image Pb coincide with each other. On the other hand, when the document conveying direction (i.e., the direction indicated by arrow S in FIGS. 4-7) is a direction perpendicular to the set binding direction, the up and down direction of the contents of the back-face scan imago Pb based on the back face P2 of the document P is opposite the up and down direction of the contents of the front-face scan image Pa based on the front face P1 of the document P, regardless of whether the document P is a portrait document or a landscape document. Since the image editing program 114b in the present embodiment in this case causes the CPU 11 to execute the processing of rotating the scan image Pb based on the back face P2 180 degrees, the scan images Pa, Pb can be displayed on the edit screen 120 such that the up and down direction of the contents of the scan image Pa and the up and down direction of the contents of the scan image Pb coincide with each other.

There will be next explained, with reference to FIGS. 8-11, symmetry of the processings executed respectively for the pair of front and back scan images. The symmetry of the processings executed respectively for the pair of front and back scan images depends upon the document conveying direction and the binding direction set for the two-sided document.

Figure 8A:
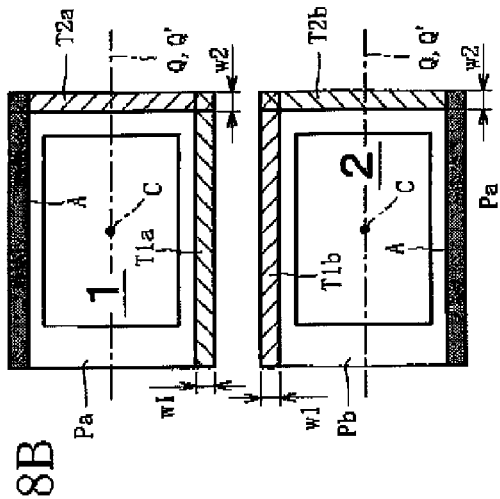
FIGS. 8A-8D are schematic views each for explaining symmetry of processing when a margin deleting processing is executed for the pair of front and back scan images.
Figure 8B:
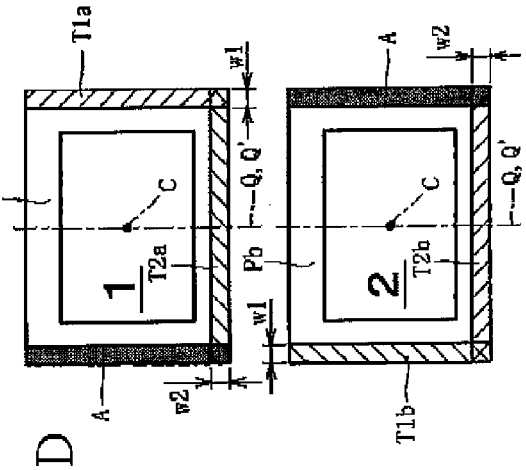

FIGS. 8A-8D are schematic views each for explaining the symmetry of processing when the margin deleting processing is executed for a pair of front and back scan images Pa, Pb. FIGS. 8A and 8B are views each illustrating a case where the pair of front and back scan images Pa, Pb are based on the document P whose binding direction extends along the long-side binding. More specifically, FIG. 8A is a view in a case where the document P is a portrait document, and FIG. 8B is a view in a case where the document P is a landscape document.

As illustrated in FIG. 8A, in a ease where a deletion area T1a having a width w1 is designated at a portion (i.e., a right portion when viewed from the user) of the scan image Pa based on the front face of the portrait document P whose binding setting is the long-side binding, which portion is opposite a portion of the scan image Pa on which the binding position A is provided, an area T1b that is symmetrical to this deletion area T1a with respect to a symmetry axis Q is set as a deletion area on the scan image Pb based on the back face. The area T1b symmetrical to the deletion area T1a is obtained by flipping the deletion area T1a with respect to the symmetry axis Q.

The symmetry axis Q is an imaginary axis extending through a center C of a scan image along the sub-scanning direction or the main scanning direction for the scan image. More specifically, when the document conveying direction coincides with a direction along the set binding direction, the symmetry axis Q extends through a center C of a scan image along the sub-scanning direction for the scan image. On the other hand, when the document conveying direction coincides with a direction perpendicular to the set binding direction, and the processing of rotating scan data representative of a scan image Pb based on a back face P2 180 degrees has been executed, the symmetry axis Q extends through a center C of the scan image along the main scanning direction for the scan image. It is noted that in FIGS. 8-10 the symmetry axis Q is illustrated on a straight line Q' that extends through the center C of the scan image along the binding direction.

Also, in a case where a deletion area T2a having a width w2 is designated at an upper portion of the scan image Pa based on the front face of the portrait document P whose binding setting is the long-side binding, an area T2b that is symmetrical to this deletion area T2a with respect to the symmetry axis Q is set as the deletion area on the scan image Pb based on the back face.

As illustrated in FIG. 8B, in a case where the deletion area T1a having the width w1 is designated at a portion (i.e., a lower portion when viewed from the user) of the scan image Pa based on the front face of the landscape document P whose binding setting is the long-side binding, which portion is opposite a portion of the scan image Pa on which the binding position A is provided, the area T1b that is symmetrical to this deletion area T1a with respect to the symmetry axis Q is set as the deletion area on the scan image Pb based on the back face. Also, in a case where the deletion area T2a having the width w2 is designated at a right portion of the scan image Pa based on the front face of the landscape document P whose binding setting is the long-side binding, the area T2b that is symmetrical to this deletion area T2a with respect to the symmetry axis Q is set as the deletion area on the scan image Pb based on the back face.

Figure 8C:
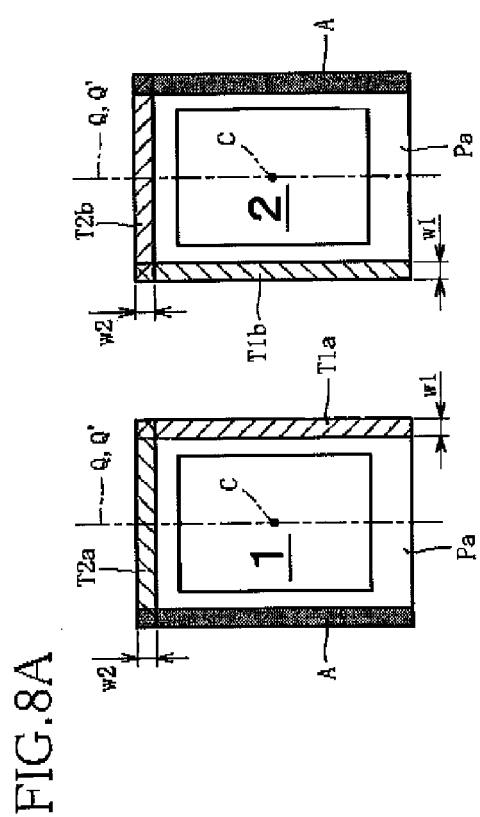
Figure 8D:
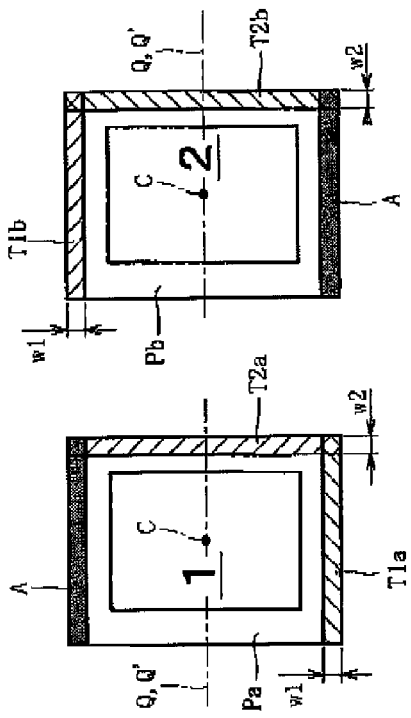

FIGS. 8C and 8D are views each illustrating a case where the pair of front and back scan images Pa, Pb are based on the document P whose binding direction extends along the short-side binding. More specifically, FIG. 8C is a view in a case where the document P is a portrait document, and FIG. 8D is a view in a case where the document P is a landscape document.

As illustrated in FIG. 8C, in a case where the deletion area T1a having the width w1 is designated at a portion (i.e., a lower portion when viewed from the user) of the scan image Pa based on the front face of the portrait document P whose binding setting is the short-side binding, which portion is opposite a portion of the scan image Pa on which the binding position A is provided, the area T1b that is symmetrical to this deletion area T1a with respect to the symmetry axis Q is set as the deletion area on the scan image Pb based on the back face. Also, in a case where the deletion area T2a having the width w2 is designated at a right portion of the scan image Pa based on the front face of the portrait document P whose binding setting is the short-side binding, the area T2b that is symmetrical to this deletion area T2a with respect to the symmetry axis Q is set as the deletion area on the scan image Pb based on the back face.

As illustrated in FIG. 8D, in a case where the deletion area T1a having the width w1 is designated at a portion (i.e., a right portion when viewed from the user) of the scan image Pa based on the front face of the landscape document P whose binding setting is the short-side binding, which portion is opposite a portion of the scan image Pa on which the binding position A is provided, the area T1b that is symmetrical to this deletion area T1a with respect to the symmetry axis Q is set as the deletion area on the scan image Pb based on the back face. Also, in a case where the deletion area T2a having the width w2 is designated at a lower portion of the scan image Pa based on the front face of the landscape document P whose binding setting is the short-side binding, the area 12b that is symmetrical to this deletion area T2a with respect to the symmetry axis Q is set as the deletion area on the scan image Pb based on the back face.

Thus, according to the cases in FIGS. 8A-8D, in the case where the pair of front and back scan images Pa, Pb are based on the document P whose binding direction extends along the long-side binding, the deletion area T1a designated for the scan image Pa based on the front face can be reflected on the scan image Pb based on the back face as the deletion area T1b that is symmetrical to the deletion area T1a with respect to the symmetry axis Q, regardless of whether the document P is a portrait document or a landscape document. Likewise, also in the case where the pair of front and back scan images Pa, Pb are based on the document P whose binding direction extends along the short-side binding, the deletion area T1a designated for the scan image Pa based on the front face can be reflected on the scan image Pb based on the back face as the deletion area T1b that is symmetrical to the deletion area T1a with respect to the symmetry axis Q, regardless of whether the document P is a portrait document or a landscape document. In any case, when the document conveying direction coincides with the binding direction, the symmetry axis Q extends in the sub-scanning direction, and when the document conveying direction is perpendicular to the binding direction, the symmetry axis Q extends in the main scanning direction.

It is noted that, also in, a case where a deletion area is designated for the scan image Pb based on the back face regardless of whether the binding setting of the scanned document P is the long-side binding or the short-side binding, an area symmetrical to the designated deletion area with respect to the symmetry axis Q can be reflected as a deletion area for the scan image Pa based on the front face.

FIGS. 9 and 10 are schematic views each for explaining symmetry of processing when the image moving processing is executed for the pair of front and back scan images Pa, Pb. FIGS. 9A and 9B are views each illustrating a case where the pair of front and back scan images Pa, Pb are based on the document P whose binding direction extends along the long-side binding. More specifically, FIG. 9A is a view in a case where the document P is a portrait document, and FIG. 9B is a view in a case where the document P is a landscape document.

As illustrated in FIG. 9A, in a case where the image moving processing is designated for the scan image Pa based on the front face of the portrait document P whose binding setting is the long-side binding, to translate the scan image Pa in a moving direction and a moving amount represented by a vector Ma, the scan image Pb based on the back face is moved in a moving direction and a moving amount represented by a vector Mb that is symmetrical to the vector Ma with respect to the symmetry axis Q.

As illustrated in FIG. 9B, in a case where the image moving processing is, designated for the scan image Pa based on the front face of the landscape document P whose binding setting is the long-side binding, to translate the scan image Pa in the moving direction and the moving amount represented by the vector Ma, the scan image Pb based on the back face is moved in the moving direction and the moving amount represented by the vector Mb that is symmetrical to the vector Ma with respect to the symmetry axis Q.

FIGS. 10A and 10B are views each illustrating a case where the pair of front and back scan images Pa, Pb are based on the document P whose binding direction extends along the short-side binding. More specifically, FIG. 10A is a view in a case where the document P is a portrait document, and FIG. 10B is a view in a case where the document P is a landscape document.

As illustrated in FIG. 10A, in a case where the image moving processing is designated for the scan image Pa based on the front face of the portrait document P whose binding setting is the short-side binding, to translate the scan image Pa in the moving direction and the moving amount represented by the vector Ma, the scan image Pb based on the back face is moved in the moving direction and the moving amount represented by the vector Mb that is symmetrical to the vector Ma with respect to the symmetry axis Q.

As illustrated in FIG. 10B, in a case where the image moving processing is designated for the scan image Pa based on the front face of the landscape document P whose binding setting is the short-side binding, to translate the scan image Pa in the moving direction and the moving amount represented by the vector Ma, the scan image Pb based on the back face is moved in the moving direction and the moving amount represented by the vector Mb that is symmetrical to the vector Ma with respect to the symmetry axis Q.

Thus, according to the cases in FIGS. 9-10, in the case where the pair of front and back scan images Pa, Pb are based on the document P whose binding direction extends along the long-side binding, the moving direction and the moving amount of the vector Ma designated for the scan image Pa based on the front face can be reflected on the scan image Pb based on the back face as the moving direction and the moving amount of the vector Mb symmetrical to the vector Ma with respect to the symmetry axis Q, regardless of whether the document P is a portrait document or a landscape document. Likewise, also in the case where the pair of front and back scan images Pa, Pb are based on the document P whose binding direction extends along the short-side binding, the moving direction and the moving amount of the vector Ma designated for the scan image Pa based on the front face can be reflected on the scan image Pb based on the back face as the moving direction and the moving amount of the vector Mb symmetrical to the vector Ma with respect to the symmetry axis Q, regardless of whether the document P is a portrait document or a landscape document.

In a case where the image moving processing is designated for the scan image Pa for which the document conveying direction coincides with the binding direction, to translate the scan image Pa by Δx in the main scanning direction and Δy in the sub-scanning direction, the symmetry axis Q extends in the sub-scanning direction, and consequently the scan image Pb based on the back face is moved by −Δx in the main scanning direction and Δy in the sub-scanning direction. On the other hand, in a case where the image moving processing is designated for the scan image Pa for which the document conveying direction is perpendicular to the binding direction, to translate the scan image Pa by Δx in the main scanning direction and Δy in the sub-scanning direction, the symmetry axis Q extends in the main scanning direction, and consequently the scan image Pb based on the back face is moved by Δx in the main scanning direction and −Δy in the sub-scanning direction.

It is noted that, also in a case where the parallel movement is designated for the scan image Pb based on the back face (in the moving direction and the moving amount) regardless of whether the binding setting of the scanned document P is the long-side binding or the short-side binding, the moving amount and the moving direction symmetrical to the designated moving direction with respect to the symmetry axis Q can be reflected on the scan image Pa based on the front face as the moving direction and the moving amount therefor.

FIGS. 11A-11D are schematic views each for explaining symmetry of processing when the rotating processing is executed for the pair of front and back scan images Pa, Pb. It is noted that the rotating processing needs to be executed for the pair of front and back scan images Pa, Pb in a case where the document P is obliquely conveyed, for example.

Figure 11A:
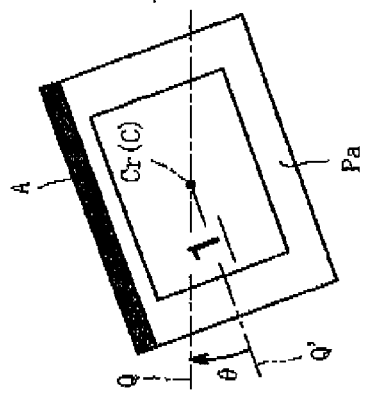
FIGS. 11A-11D are schematic views each for explaining symmetry of processing when a rotating processing is executed for the pair of front and back scan images.
Figure 11B:
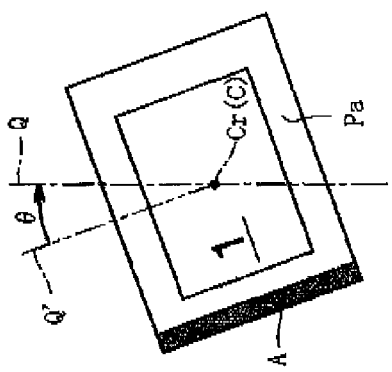

FIGS. 11A and 11B are views each illustrating a case where the pair of front and back scan images Pa, Pb are based on the document P whose binding direction extends along the long-side binding. More specifically, FIG. 11A is a view in a case where the document P is a portrait document, and FIG. 11B is a view in a case where the document P is a landscape document. It is noted that, in FIGS. 11A-11D, the straight line Q' that extends through the center C of the scan image along the binding direction is inclined with respect to the symmetry axis Q. Also, in FIGS. 11A-11D, a rotation center Cr is located at the same position as the center C of the scan image.

As illustrated in FIG. 11A, in a case where the rotating processing is designated for the scan image Pa based on the front face of the portrait document P whose binding setting is the long-side binding to rotate the scan image Pa clockwise by angle θ about the rotation center Cr such that the straight line Q' coincides with the symmetry axis Q, the scan image Pb based on the back face is rotated about the rotation center Cr in the rotational amount and the rotational direction symmetrical to the designated rotational direction with respect to the symmetry axis Q. Also, as illustrated in FIG. 11B, in a case where the rotating processing is designated for the scan image Pa based on the front face of the landscape document P whose binding setting is the long-side binding to rotate the scan image Pa clockwise by angle θ about the rotation center Cr such that the straight line Q' coincides with the symmetry axis Q, the scan image Pb based on the back face is rotated about the rotation center Cr in the rotational amount and the rotational direction symmetrical to the designated rotational direction with respect to the symmetry axis Q.

That is, in the case where the pair of front and back scan images Pa, Pb are based on the document P whose binding direction extends along the long-side binding, when the rotating processing is designated for the scan image Pa based on the front face to rotate the scan image Pa clockwise by angle θ about the rotation center Cr, the scan image Pb based on the back face is rotated counterclockwise by angle θ (i.e., −θ) about the rotation center Cr regardless of whether the document P is a portrait document or a landscape document.

Figure 11C:
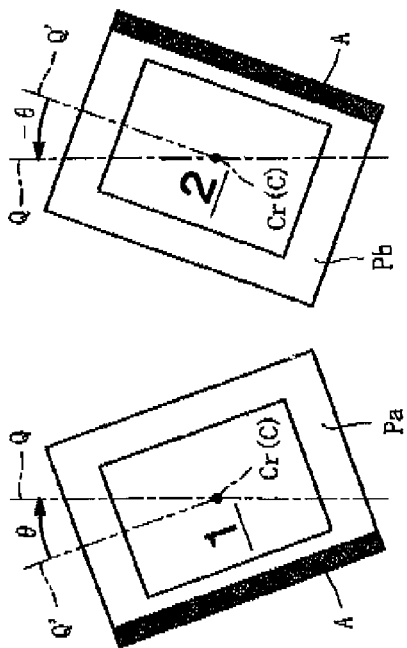
Figure 11D:
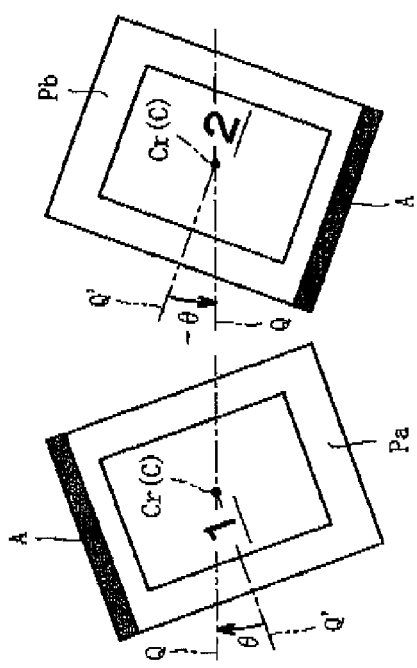

FIGS. 11C and 11D are views each illustrating a case where the pair of front and back scan images Pa, Pb are based on the document P whose binding direction extends along the short-side binding. More specifically, FIG. 11C is a view in a case where the document P is a portrait document, and FIG. 11D is a view in a case where the document P is a landscape document.

As illustrated in FIG. 11C, in a case where the rotating processing is designated for the scan image Pa based on the front face of the portrait document P whose binding setting is the short-side binding to rotate the scan image Pa clockwise by angle θ about the rotation center Cr such that the straight line Q' coincides with the symmetry axis Q, the scan image Pb based on the back face is rotated about the rotation center Cr in the rotational amount and the rotational direction symmetrical to the designated rotational direction with respect to the symmetry axis Q. Also, as illustrated in FIG. 11D, in a case where the rotating processing is designated for the scan image Pa based on the front face of the landscape document P whose binding setting is the short-side binding to rotate the scan image Pa clockwise by angle θ about the rotation center Cr such that the straight line Q' coincides with the symmetry axis Q, the scan image Pb based on the back face is rotated about the rotation center Cr in the rotational amount and the rotational direction symmetrical to the designated rotational direction with respect to the symmetry axis Q.

That is, in the case where the pair of front and back scan images Pa, Pb are based on the document P whose binding direction extends along the short-side binding, when the rotating processing is designated for the scan image Pa based on the front face to rotate the scan image Pa clockwise by angle θ about the rotation center Cr, the scan image Pb based on the back face is rotated counterclockwise by angle θ (i.e., −θ) about the rotation center Cr regardless of whether the document P is a portrait document or a landscape document.

It is noted that also in a case where the rotating processing is designated for the scan image Pb based on the back face (by the rotational amount and in the rotational direction) regardless of whether the binding setting of the scanned document P is the long-side binding or the short-side binding, the rotational amount and the rotational direction symmetrical to the designated rotational direction with respect to the symmetry axis Q can be reflected on the scan image Pa based on the front face as the moving direction and the moving amount therefor.

Though not shown, as in the case of the parallel movement, in a case where a rotation-center moving processing for moving the rotation center Cr is designated for one of the pair of front and back scan images Pa, Pb, the moving amount and the moving direction symmetrical to the moving direction designated for the rotation center Cr of the one scan image with respect to the symmetry axis Q are reflected on the other scan image. That is, in a case where the moving direction and the moving amount are designated for the rotation center Cr of the scan image Pa based on the front face, for example, the moving amount and the moving direction symmetrical to the moving direction designated for the rotation center Cr of the scan image Pa with respect to the symmetry axis Q are set as the moving amount and the moving direction for the rotation center Cr of the other scan image.

Thus, according to FIGS. 8-11, in a case where the set binding direction and the document conveying direction coincide with each other regardless of whether the document P is a portrait document or a landscape document, a processing symmetrical to the processing designated for one of the scan images (e.g., the scan image Pa based on the front face) with respect to an axis extending through the center C of the scan image along the sub-scanning direction for the scan image is executed for the other of the scan images (e.g., the scan image Pb based on the back face).

On the other hand, in a case where the set binding direction and the document conveying direction are perpendicular to each other regardless of whether the document P is a portrait document or a landscape document, a processing symmetrical to the processing designated for one of the scan images (e.g., the scan image Pa based on the front face) with respect to an axis extending through the center C of the scan image along the main scanning direction for the scan image is executed for the other of the scan images (e.g., the scan image Pb based on the back face).

Figure 12:
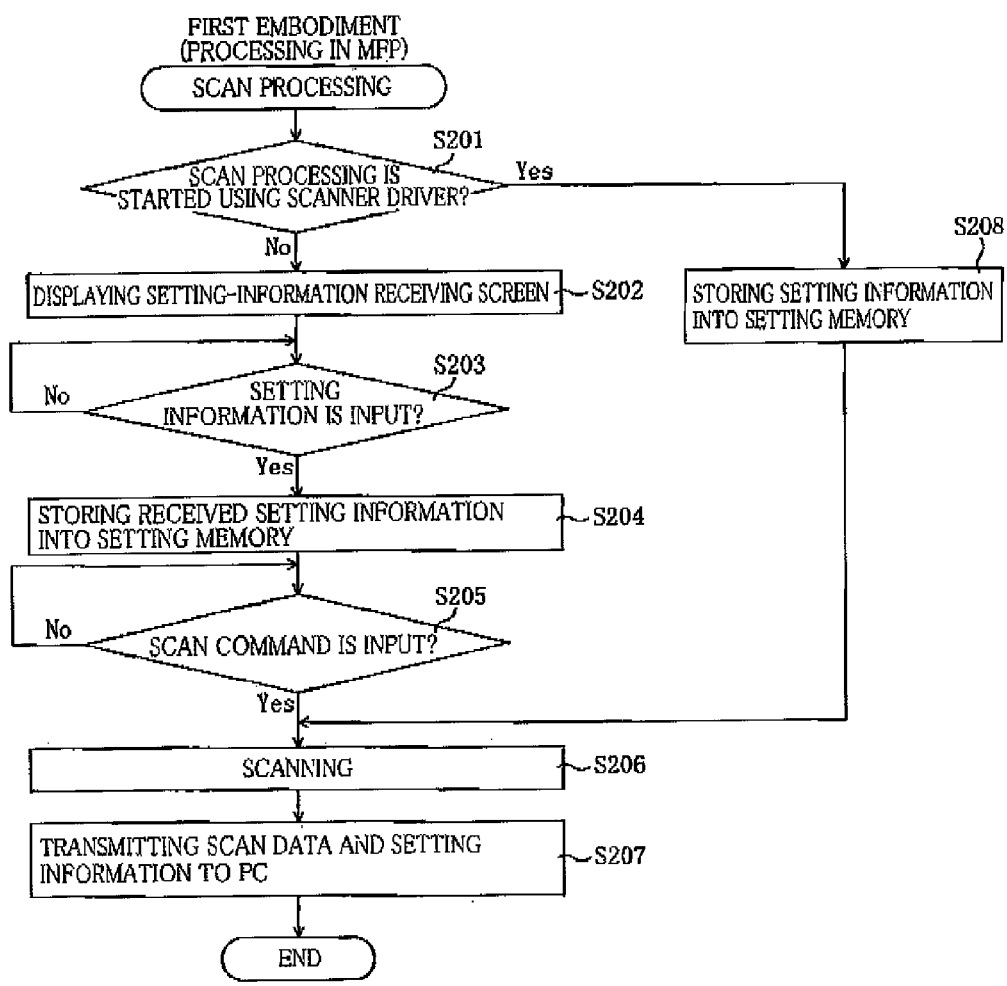
FIG. 12 is a flow chart illustrating a scan processing executed by a CPU of the MFP.

There will be next explained, with reference to FIG. 12, a scan processing executed by the MFP 1 having the above-described configuration. The scan processing is started when the scan command is received by the MFP 1 from the PC 100 using the scanner driver 114a or when the execution of the scanning function is selected on the MFP 1.

The flow in FIG. 12 begins with step S201 (hereinafter "step" is omitted where appropriate) at which the CPU 11 determines whether this scan processing is started based on the receipt of the scan command by the PC 100 using the scanner driver 114a or not. When a positive decision is made at S201 (S201: Yes), the CPU 11 at S208 stores the setting information contained in the received scan command into the setting memory 13a, and this flow goes to S206.

On the other hand, when this scan processing is started based on the selection of the execution of the scanning function in the MFP 1 (S201: No), the CPU 11 at S202 controls the LCD 14 to display thereon a setting-information receiving screen. When the setting information is not input on the setting-information receiving screen (S203: No), the CPU 11 repeats this processing at S203 to wait for the input of the setting information. When the setting information is input on the setting-information receiving screen (S203: Yes), the CPU 11 at S204 stores the received setting information into the setting memory 13a.

When the scan command is not input (S205: No), the CPU 11 repeats this processing at S205 to wait for the input of the scan command. When the scan command is input (S205: Yes), this flow goes to S206.

At S206, the CPU 11 controls the MW 17 to convey the document(s) one by one and controls the scanner 16 to scan the document(s) conveyed by the ADF 17. The CPU 11 stores scan data obtained by the scanning, into the scan-data memory 13b. It is noted that in a case where the scan command received from the PC 100 indicates two-sided scanning or in a case where the setting information input using the setting screen indicates the two-sided scanning, the CPU 11 at S206 controls the reading units 16a1, 16a2 to respectively scan front and back faces of the document. When the front and back hoes of the document are scanned, the CPU 11 stores values each representing an ordinal number of acquisition of corresponding image data, into the header area D2 of each scan data (sea FIG. 2), as the obtained-page number 51 and the current-page number 52.

Upon completion of the scanning at S206, the CPU 11 at S207 transmits, to the PC 100, the scan data stored in the scan-data memory 13b and the setting information stored in the setting memory 13a, and this processing ends. It is noted that the PC 100 to which the scan data and the setting information are transmitted at S207 is a PC that has transmitted the scan command or that has been designated by a destination setting contained in the setting information.

There will be next explained, with reference to FIGS. 13-17, processings executed by the PC 100 having the above-described configuration. First, the scan-data editing processing will be explained with reference to the flow chart in FIG. 13. This scan-data editing processing is started when the PC 100 receives the scan data and the setting information from the MFP 1 or when the user designates the scan data stored in the storage memory 114c to edit the scan data. In the present embodiment, it is assumed that the MFP 1 that creates the scan data is designed to convey the document in the long-side extending direction. That is, the scan data received by the PC 100 from the MFP 1 is limited to, scan data created by the MFP 1 whose document conveying direction coincides with the long-side extending direction.

Figure 13:
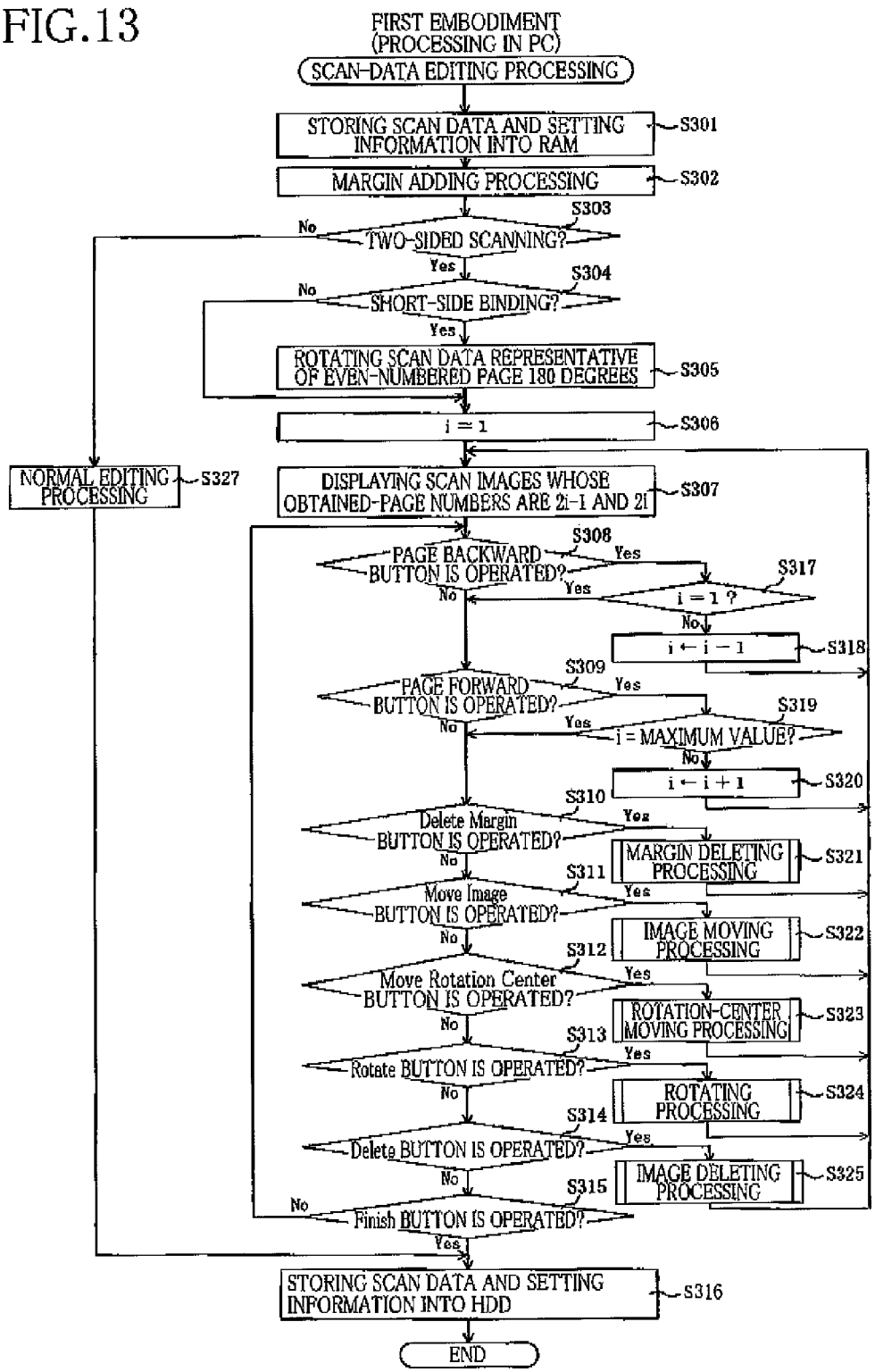
FIG. 13 is a flow chart illustrating a scan-data editing processing executed by a CPU of the PC.

The flow in FIG. 13 begins with S301 at which the CPU 111 stores the scan data and the setting information into the RAM 113. Specifically, when this scan-data editing processing is started in response to the receipt of the scan data and the setting information from the MFP 1, the CPU 111 at S301 stores the received scan data into the processing-data memory 113b and the received setting information into the setting memory 113a. On the other hand, in the case where the processing is started in response to the designation of the scan data stored in the storage memory 114c, the CPU 111 at S301 stores the designated scan data into the processing-data memory 113b and stores, into the setting memory 113a, setting information corresponding to the designated scan data among the setting information stored in the setting memory 114d.

Then at S302, the CPU 111 executes a margin adding processing for the scan data stored in the processing-data memory 113b. Specifically, the CPU 111 at S302 adds a margin to scan data whose sheet size is smaller than the sheet size indicated by sheet size information contained in the setting information stored in the setting memory 113a among the scan data stored in the processing-data memory 113b, such that the scan data suits the sheet size. It is noted that, in the case where the processing is started in response to the designation of the scan data stored in the storage memory 114c, the CPU 111 does not execute the processing at S302, and the flow goes to S303.

Then, when the designation of the two-sided scanning is not included in the setting information stored in the setting memory 113a (S303: No), the CPU 11 at S327 executes a normal editing processing, and this flow goes to S316. It is noted that the normal editing processing at S327 is not relevant to the present invention, and an explanation thereof is omitted.

On the other hand, when the designation of the two-sided scanning is included in the setting information stored in the setting memory 113a and when the binding information included in the setting information indicates the short-side binding (S303: Yes, S304: Yes), the CPU 111 at S305 rotates scan data representative of an even-numbered page 180 degrees among the scan data, and this flow goes to S306. It is noted that the processing at S305 is executed only in the case where the present processing is started in response to the receipt of the scan data and the setting information from the MFP 1. At S305, the CPU 111 selects the scan data representative of the even-numbered page as data to be processed, on the basis of the obtained-page number 51 stored in the header area D2 of the scan data. In the present embodiment, since the scan data received by the PC 100 from the MFP 1 is the scan data created by the MFP 1 whose document conveying direction coincides with the long-side extending direction as described above, in the case where the binding direction extends along the short-side binding, the received scan data is rotated 180 degrees at S305. As a result, the up and down direction of the contents of the scan image Pa corresponding to the front scan data and the up and down direction of the contents of the scan image Pb corresponding to the back scan data coincide with each other.

On the other hand, when the designation of the two-sided scanning is included in the setting information stored in the setting memory 113a and when the binding information included in the setting information indicates the long-side binding (S303: Yes, S304: No), this flow goes to S306. That is, in the case where the binding direction extends along the long-side binding, when the document conveying direction coincides with the binding direction, the up and down direction of the contents of the scan image Pa corresponding to the front scan data and the up and down direction of the contents of the scan image Pb corresponding to the back scan data coincide with each other. Thus, there is no need to rotate the scan data representative of the even-numbered page 180 degrees.

The CPU 111 at S306 sets a variable i to one 1. Then at S307, the CPU 111 displays scan images (i.e., the pair of front and back scan images Pa, Pb) respectively corresponding to scan data whose obtained-page number 51 is 2i−1 and scan data whose obtained-page number 51 is 2i among the scan data stored in the processing-data memory 113b. Specifically, the CPU 111 at S307 displays the edit screen 120 illustrated in FIG. 3 on the LCD 116 and displays the scan images Pa, Pb on the edit screen 120.

In a case where the scan data whose obtained-page number 51 is 2i−1 or the scan data whose obtained-page number 51 is 2i does not exist due to its deletion, the CPU 111 at S307 displays only one scan image corresponding to the present scan data (see FIG. 3B). It is noted that in a case where neither the scan data whose obtained-page number 51 is 2i−1 nor the scan data whose obtained-page number 51 is 2i exists due to their deletion, the edit screen 120 containing no scan images is displayed at S307.

Then, when the page backward button 122 is operated (S308: Yes) and when the variable i is not one (S317: No), the CPU 111 at S318 subtracts one from the variable i, and this flow returns to S307. As a result, the preceding pair of front and back scan images are displayed on the edit screen 120.

When the page backward button 122 in not operated (S308: No) or when the page backward button 122 is operated, and the variable i is one (S308: Yes, S317: Yes), this flow goes to S309.

At S309, when the page forward button 121 is not operated (S309: No) or when the page forward button 121 is operated, and the variable i is the maximum value (S309: Yes, S319: Yes), this flow goes to S310.

At S309, when the page forward button 121 is operated (S309: Yes) and the variable i is not the maximum value (S319: No), the CPU 111 at S320 adds one to the variable i, and this flow returns to S307. As a result, the next pair of front and back scan images are displayed on the edit screen 120.

When the page forward button 121 is not operated, and the Delete Margin button 124 is operated (S309: No, S310: Yes), the CPU 111 at S321 executes the margin deleting processing for the scan image(s) being displayed on the edit screen 120, and this flow returns to S307. As a result, the pair of front and back scan images after the margin deleting processing are displayed on the edit screen 120. It is noted that the margin deleting processing at S321 will be explained in detail later with reference to FIG. 14.

When the Delete Margin button 124 is not operated, and the Move Image button 125 is operated (S310; No, S311: Yes), the CPU 111 at S322 executes the image moving processing for the scan image(s) being displayed on the edit screen 120, and this flow returns to S307. As a result, the pair of front and back scan images after the image moving processing are displayed on the edit screen 120. It is noted that the image moving processing at S322 will be explained in detail later with reference to FIG. 15.

When the Move Image button 125 is not operated, and the Move Rotation Center button 127 is operated (S311: No, S312: Yes), the CPU 111 at S323 executes the rotation-center moving processing for the scan image(s) being displayed on the edit screen 120, and this flow returns to S307. As a result, the pair of front and back scan images after the rotation-center moving processing are displayed on the edit screen 120. It is noted that the rotation-center moving processing at S323 will be explained in detail later with reference to FIG. 16.

When the Move Rotation Center button 127 is not operated, and the Rotate button 126 is operated (S312: No, S313: Yes), the CPU 111 at S324 executes the rotating processing for the scan image(s) being displayed on the edit screen 120, and this flow returns to S307. As a result, the pair of front and back scan images after the rotating processing are displayed on the edit screen 120. It is noted that the rotating processing at S324 will be explained in detail later with reference to FIG. 17A.

When the Rotate button 126 is not operated, and the Delete button 128 is operated (S313: No, S314: Yes), the CPU 111 at S325 executes an image deleting processing for the scan image(s) being displayed on the edit screen 120 to delete the designated scan image (i.e., the designated scan data), and this flow returns to S307. It is noted that the image deleting processing at S325 will be explained in detail later with reference to FIG. 17B.

When the Delete button 128 is not operated, and the Finish button 129 is not operated (S314: No, S315: No), this flow returns to S308. On the other hand, when the Finish button 129 is operated (S315: Yes), this flow goes to S316.

At S316, the CPU 111 stores the scan data and the setting information after the editing processing into the HDD 114. Specifically, in the case where the processing is started in response to the designation of the scan data stored in the storage memory 114c, the CPU 111 at S316 overwrites the scan data stored in the storage memory 114c with the scan data after the editing processing and stores the corresponding setting information into the setting memory 114d. On the other hand, when the present processing is started in response to the receipt of the scan data and the setting information from the MFP 1, the CPU 111 at S316 stores the scan data after the editing processing into the storage memory 114c and stores the setting information into the setting memory 114d so as to be assigned to the scan data stored into the storage memory 114c.

Figure 14:
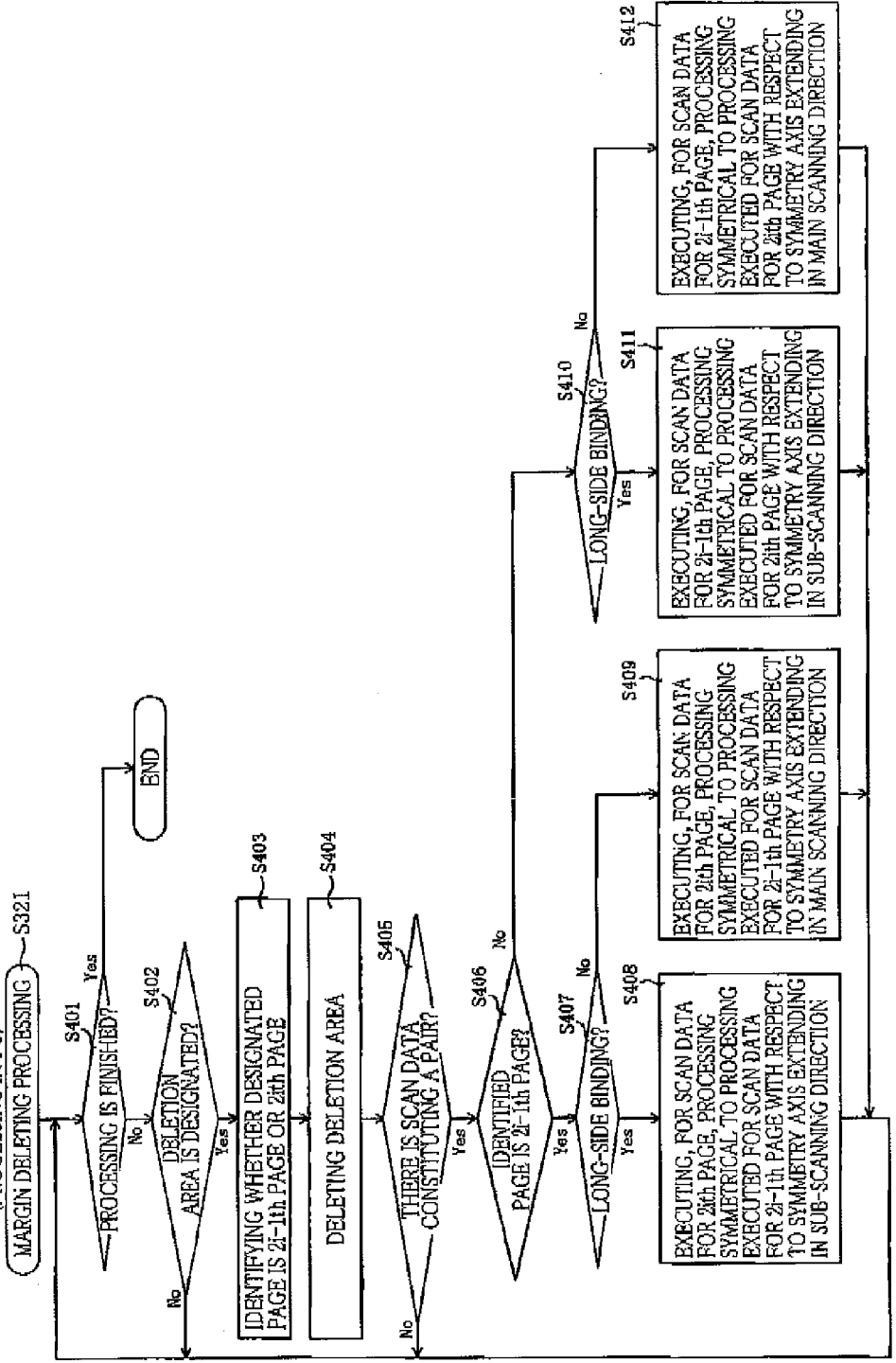
FIG. 14 is a flow chart illustrating the margin deleting processing executed in the scan-data editing processing.

FIG. 14 is a flow chart illustrating the margin deleting processing at S321. In the margin deleting processing, when the command for finishing the processing is received by the CPU 111 (S401: Yes), this processing ends. It is noted that the command for finishing the processing is supplied when the user performs a predetermined operation using the input device 115 (e.g., pressing a button, not shown, displayed on the edit screen 120 for finishing the processing).

On the other hand, when the command for finishing the processing is not received by the CPU 111 (S401: No) and when the deletion area is designated for the scan image being displayed on the edit screen 120 (S402: Yes), this flow goes to S403. On the other hand, when the deletion area is not designated for the scan image being displayed on the edit screen 120 (S402: No), this flow returns to S401

The CPU 111 at S403 identifies whether the page for which the deletion area has been designated is a 2i−1th page or a 2ith page. Then at S404, the CPU 111 executes a processing of deleting the deletion area, for scan data representative of the page for which the deletion area has been designated, and this flow goes to S405.

The CPU 111 at S405 determines whether there is scan data constituting a pair with the page for which the deletion area has been designated. Specifically, when the page for which the deletion area has been designated is the 2i−1th page, the CPU 111 at S405 determines whether or not there is a 2ith page constituting a pair with the page for which the deletion area has been designated. On the other hand, when the page for which the deletion area has been designated is the 2ith page, the CPU 111 at S405 determines whether or not there is a 2i−1th page constituting a pair with the page for which the deletion area has been designated.

When the CPU 111 determines that there is no page constituting a pair (S405: No), this flow returns to S401. On the other hand, when the CPU 111 determines that there is a page constituting a pair (S405: Yes), this flow goes to S406.

When the page for which the deletion area has been designated the page identified at S403) is the 2i−1th page and when the binding information included in the setting information stored in the setting memory 113a indicates the long-side binding (S406: Yes, S407: Yes), the CPU 111 at S408 executes, for the scan data representative of the 2ith page, a processing symmetrical to the processing executed at S404 for the scan data representative of the 2i−1th page with respect to the symmetry axis Q extending through the center of the scan image along the sub-scanning direction for the scan data (i.e., an axis extending in the sub-scanning direction upon reading the images), and this flow goes to S401.

When the page for which the deletion area has been designated is the 2i−1th page and when the binding information included in the setting information stored in the setting memory 113a indicates the short-side binding (S406: Yes, S407: No), the CPU 111 at S409 executes, for the scan data representative of the 2ith page, a processing symmetrical to the processing executed at S404 for the scan data representative of the 2i−1th page with respect to the symmetry axis Q extending through the center of the scan image along the main scanning direction for the scan data (i.e., an axis extending in the main scanning direction upon reading the images), and this flow goes to S401.

When the page for which the deletion area has been designated is the 2ith page and when the binding information included in the setting information stored in the setting memory 113a indicates the long-side binding (S406: No, S410: Yes), the CPU 111 at S411 executes, for the scan data representative of the 2i−1th page, a processing symmetrical to the processing executed at S404 for the scan data representative of the 2ith page with respect to the symmetry axis Q extending through the center of the scan image along the sub-scanning direction for the scan data, and this flow goes to S401.

When the page for which the deletion area has been designated is the 2ith page and when the binding information included in the setting information stored in the setting memory 113a indicates the short-side binding (S406: No, S410: No), the CPU 111 at S412 executes, for the scan data representative of the 2i−1th page, a processing symmetrical to the processing executed at S404 for the scan data representative of the 2ith page with respect to the symmetry axis Q extending through the center of the scan image along the main scanning direction for the scan data, and this flow goes to S401.

Figure 15:
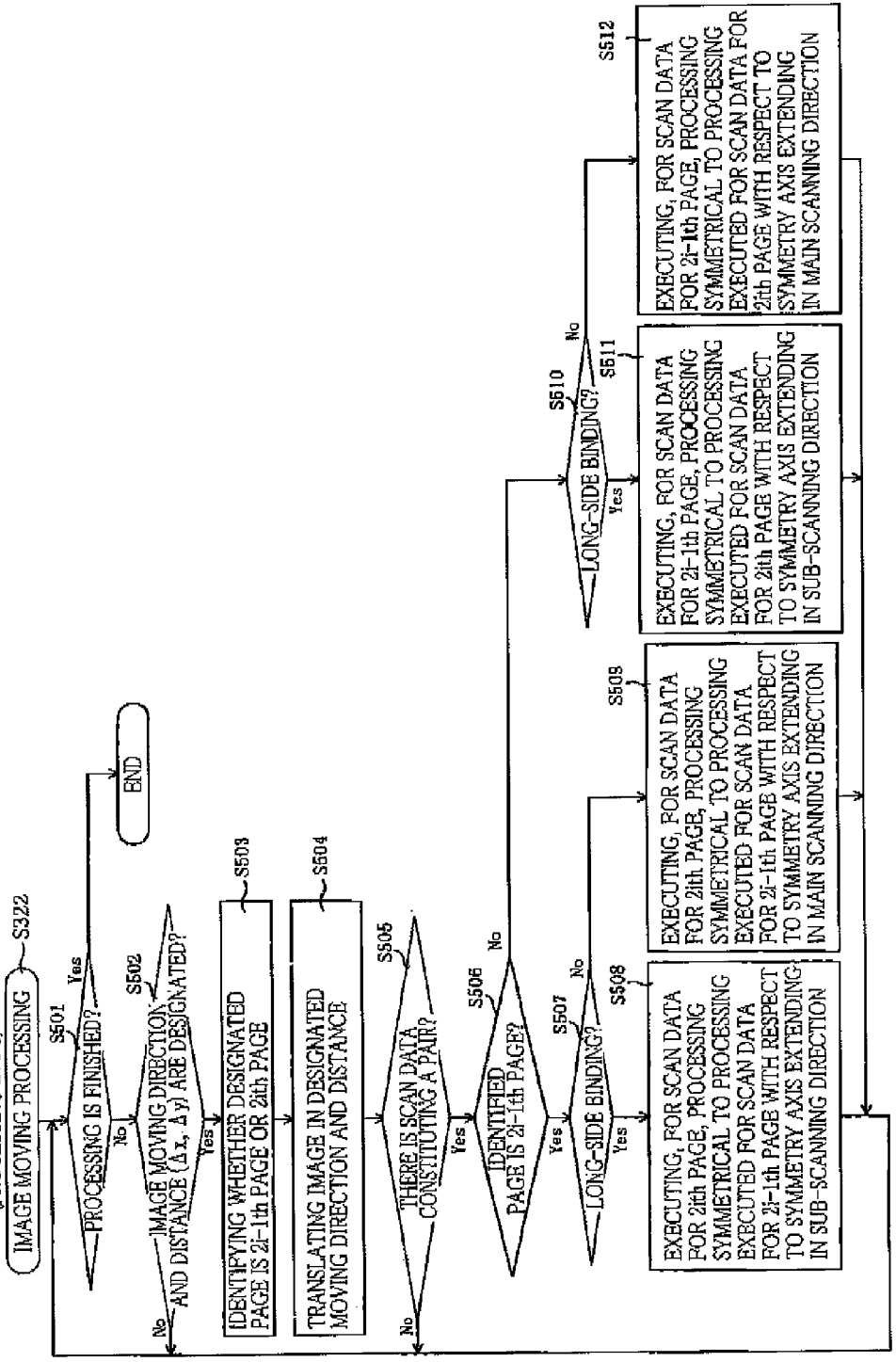
FIG. 15 is a flow chart illustrating the image moving processing executed in the scan-data editing processing.

FIG. 15 is a flow chart illustrating the image moving processing at S322. In the image moving processing, when the command for finishing the processing is received by the CPU 111 (S501: Yes), this processing ends.

On the other hand, when the command for finishing the processing is not received by the CPU 111 (S501: No) and when a direction and a distance of movement of the image, i.e., image moving direction and distance ($\Delta x$, $\Delta y$) are designated for the scan image being displayed on the edit screen 120 (S502: Yes), this flow goes to S503. It is noted that $\Delta x$ represents a moving distance and a moving direction in the main scanning direction, and $\Delta y$ represents a moving distance and a moving direction in the sub-scanning direction. On the other hand, when the image moving direction and distance are not designated for the scan image being displayed on the edit screen 120 (S502: No), this flow returns to S501.

The CPU 111 at S503 identifies whether the page for which the image moving direction and distance have been designated is a 2i−1th page or a 2ith page. Then at S504, the CPU 111 executes a processing of translating the image in the designated moving direction and distance ($\Delta x$, $\Delta y$), for scan data representative of the page for which the image moving direction and distance have been designated, and this flow goes to S505.

The CPU 111 at S505 determines whether there is scan data constituting a pair with the page for which the image moving direction and distance have been designated. The processing in S505 is executed in the same manner as the above-described processing at S405.

When the CPU 111 determines that there is no page constituting a pair (S505: No), this flow returns to S501. On the other hand, when the CPU 111 determines that there is a page constituting a pair (S505: Yes), this flow goes to S506.

When the page for which the image moving direction and distance have been designated (i.e., the page identified at S503) is the 2i–1th page and when the binding information included in the setting information stored in the setting memory 113a indicates the long-side binding (S061: Yes, S507: Yes), the CPU 111 at S508 executes, for the scan data representative of the 2ith page, a processing symmetrical to the processing executed at S504 for the scan data representative of the 2i–1th page with respect to the symmetry axis Q extending through the center of the scan image along the sub-scanning direction for the scan data (that is, the CPU 111 executes a processing of translating the image in the moving direction and distance (−Δx, Δy) when the document P is a portrait document and translating the image in the moving direction and distance (Δx, −Δy) when the document P is a landscape document), and this flow goes to S501.

When the page for which the image moving direction and distance have been designated is the 2i–1th page and when the binding information included in the setting information stored in the setting memory 113a indicates the short-side binding (S506: Yes, S507: No), the CPU 111 at S509 executes, for the scan data representative of the 2ith page, a processing symmetrical to the processing executed at S504 for the scan data representative of the 2i–1th page with respect to the symmetry axis Q extending through the center of the scan image along the main scanning direction for the scan data (that is, the CPU 111 executes a processing of translating the image in the moving direction and distance (Δx, −Δy) when the document P is a portrait document and translating the image in the moving direction and distance (−Δx, Δy) when the document P is a landscape document), and this flow goes to S501.

When the page for which the image moving direction and distance have been designated is the 2ith page and when the binding information included in the setting information stored in the setting memory 113a indicates the long-side binding (S506: No, S510: Yes), the CPU 111 at S511 executes, for the scan data representative of the 2i–1th page, a processing symmetrical to the processing executed at S504 for the scan data representative of the 2ith page with respect to the symmetry axis Q extending through the center of the scan image along the sub-scanning direction for the scan data (that is, the CPU 111 executes a processing of translating the image in the moving direction and distance (−Δx, Δy) when the document P is a portrait document and translating the image in the moving direction and distance (Δx, −Δy) when the document P is a landscape document), and this flow goes to S501.

When the page for which the image moving direction and distance have been designated is the 2ith page and when the binding information included in the setting information stored in the setting memory 113a indicates the short-side binding (S506: No, S510: No), the CPU 111 at S512 executes, for the scan data representative of the 2i–1th page, a processing symmetrical to the processing executed at S504 for the scan data representative of the 2ith page with respect to the symmetry axis Q extending through the center of the scan image along the main scanning direction for the scan data (that is, the CPU 111 executes a processing of translating the image in the moving direction and distance (Δx, −Δy) when the document P is a portrait document and translating the image in the moving direction and distance (−Δx, Δy) when the document P is a landscape document), and this flow goes to S501.

FIG. 16 is a flow chart illustrating the rotation-center moving processing at S323. In the rotation-center moving processing, when the command for finishing the processing is received by the CPU 111 (S601: Yes), this processing ends.

On the other hand, when the command for finishing the processing is not received by the CPU 111 (S601: No) and when a direction and a distance of movement of the rotation center, i.e., rotation-center moving direction and distance (Δx, Δy) are designated for the scan image being displayed on the edit screen 120 (S602: Yes), this flow goes to S603. It is noted that Δx represents a moving distance and a moving direction in the main scanning direction, and Δy represents a moving distance and a moving direction in the sub-scanning direction. On the other hand, when the rotation-center moving direction and distance are not designated for the scan image being displayed on the edit screen 120 (S602: No), this flow returns to S601.

The CPU 111 at S603 identifies whether the page for which the rotation-center moving direction and distance have been designated is a 2i–1th page or a 2ith page. Then at S604, the CPU 111 executes a processing of translating the rotation center in the designated moving direction and distance (Δx, Δy), for scan data representative of the page for which the rotation-center moving direction and distance have been designated, and this flow goes to S605.

The CPU 111 at S605 determines whether there is scan data constituting a pair with the page for which the rotation-center moving direction and distance have been designated. The processing in S605 is executed in the same manner as the above-described processing at S405.

When the CPU 111 determines that there is no page constituting a pair (S605: No), this flow returns to S601. On the other band, when the CPU 111 determines that there is a page constituting a pair (S605: Yes), this flow goes to S606.

When the page for which the rotation-center moving direction and distance have been designated (i.e., the page identified at S603) is the 2i–1th page and when the binding information included in the setting information stored in the setting memory 113a indicates the long-side binding (S606: Yes, S607: Yes), the CPU 111 at S608 executes, for the scan data representative of the 2ith page, a processing symmetrical to the processing executed at S604 for the scan data representative of the 2i–1th page with respect to the symmetry axis Q extending through the center of the scan image along the sub-scanning direction for the scan data (that is, the CPU 111 executes a processing of translating the rotation center in the moving direction and distance (−Δx, Δy) when the document P is a portrait document and translating the rotation center in the moving direction and distance (Δx, −Δy) when the document P is a landscape document), and this flow goes to S601.

When the page for which the rotation-center moving direction and distance have been designated is the 2i–1th page and when the binding information included in the setting information stored in the setting memory 113a indicates the short-side binding (S606: Yes, S607: No), the CPU 111 at S609 executes, for the scan data representative of the 2ith page, a processing symmetrical to the processing executed at 5604 for the scan data representative of the 2i–1th page with respect to the symmetry axis Q extending through the center of the scan image along the main scanning direction for the scan data (that is, the CPU 111 executes a processing of translating the rotation center in the moving direction and distance (Δx, −Δy) when the document P is a portrait document and translating the rotation center in the moving direction and distance (−Δx, Δy) when the document P is a landscape document), and this flow goes to S601.

When the page for which the rotation-center moving direction and distance have been designated is the 2ith page and when the binding information included in the setting information stored in the setting memory 113a indicates the long-side binding (S606: No, S610: Yes), the CPU 111 at S611 executes, for the scan data representative of the 2i−1th page, a processing symmetrical to the processing executed at S604 for the scan data representative of the 2ith page with respect to the symmetry axis Q extending through the center of the scan image along the sub-scanning direction for the scan data (that is, the CPU 111 executes a processing of translating the rotation center in the moving direction and distance (−Δx, Δy) when the document P is a portrait document and translating the rotation center in the moving direction and distance (Δx, −Δy) when the document P is a landscape document), and this flow goes to S601.

When the page for which the moving direction and distance have been designated is the 2ith page and when the binding information included in the setting information stored in the setting memory 113*a* indicates the short-side binding (S606: No, S610: No), the CPU 111 at S612 executes, for the scan data representative of the 2i−1th page, a processing symmetrical to the processing executed at S604 for the scan data representative of the 2ith page with respect to the symmetry axis Q extending through the center of the scan image along the main scanning direction for the scan data (that is, the CPU 111 executes a processing of translating the rotation center in the moving direction and distance (Δx, −Δy) when the document P is a portrait document and translating the rotation center in the moving direction and distance (Δx, −Δy) when the document P is a landscape document), and this flow goes to S601.

Figure 17A:
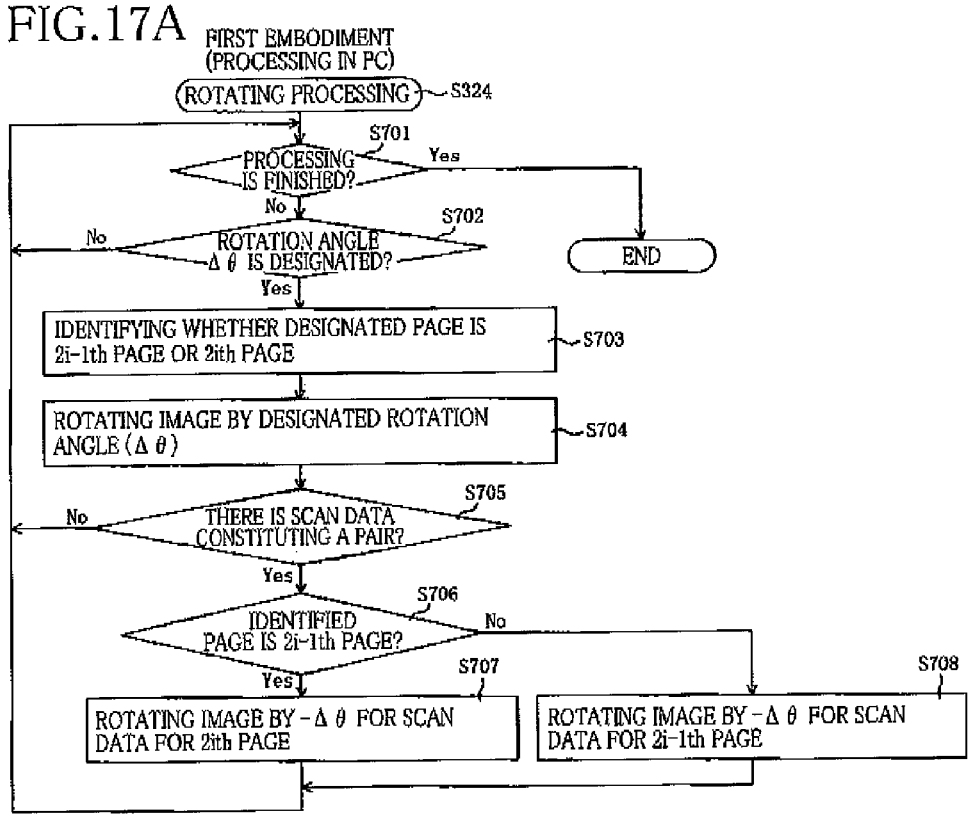
FIGS. 17A and 17B are flow charts respectively illustrating the rotating processing and an image deleting processing executed in the scan-data editing processing.

FIG. 17A is a flow chart illustrating the rotating processing at S324. In the rotating processing, when the command for finishing the processing is received by the CPU 111 (S701: Yes), this processing ends.

On the other hand, when the command for finishing the processing is not received by the CPU 111 (S701: No) and when rotation angle Δθ (i.e., a rotational direction and a rotational amount) is designated for the scan image being displayed on the edit screen 120 (S702: Yes), this flow goes to S703. On the other band, when the rotation angle is not designated for the scan image being displayed on the edit screen 120 (S702: No), this flow returns to S701.

The CPU 111 at S703 identifies whether the page for which the rotation angle has been designated is a 2i−1th page or a 2ith page. Then at S704, the CPU 111 executes a processing of rotating the image about the current rotation center by the designated rotation angle (Δθ), for scan data representative of the page for which the rotation angle has been designated, and this flow goes to S705. The CPU 111 at 5705 determines whether there is scan data constituting a pair with the page for which the rotation angle has been designated. The processing in S705 is executed in the same manner as the above-described processing at S405.

When the CPU 111 determines that there is no page constituting a pair (S705: No), this flow returns to S701. On the other hand, when the CPU 111 determines that there is a page constituting a pair (S705: Yes), this flow goes to S706.

When the page for which the rotation angle has been designated (i.e., the page identified at S703) is the 2i−1th page (S706: Yes), the CPU 111 at S707 executes the processing of rotating the image by −Δθ about the current rotation center, for the scan data representative of the 2ith page, and this flow goes to S701.

When the page for which the rotation angle has been designated is the 2ith page (S706: Yes), the CPU 111 at S708 executes the processing of rotating the image by −Δθ about the current rotation center, for the scan data representative of the 2i−1th page, and this flow goes to S701.

Figure 17B:
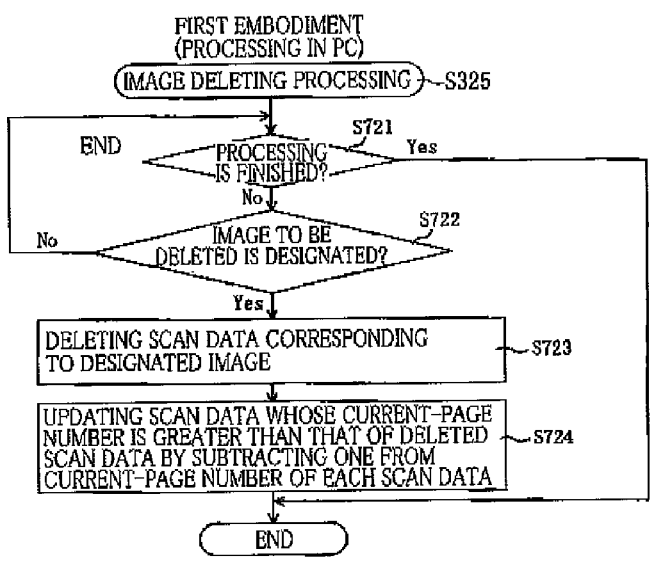

FIG. 17B is a flow chart illustrating the image deleting processing at 5325. In the image deleting processing, when the command for finishing the processing is received by the CPU 111 (S721: Yes), this processing ends.

On the other hand, when the command for finishing the processing is not received by the CPU 111 (S721: No) and when the scan image being displayed on the edit screen 120 is designated as an image to be deleted (S722: Yes), this flow goes to S723. On the other hand, when the scan image being displayed on the edit screen 120 is not designated as an image to be deleted (S722: No), this flow returns to S721.

The CPU 111 at S723 deletes scan data corresponding to the designated image to be deleted. Then at S724, the CPU 111 updates scan data whose current-page number 52 stored in the header area D2 is greater than that of the deleted scan data by subtracting one from the current-page number 52 of each scan data, and this processing ends.

In the image editing program 114*b* in the present embodiment, when the user designates the area deletion, the image translation, the image rotation, or the movement of the rotation center for one of the pair of front and back scan images Pa, Pb displayed on the edit screen 120, the CPU 111 executes the designated processing for the one scan image and executes, for the other scan image, a processing symmetrical to the processing with respect to the symmetry axis Q determined by the set binding direction and the document conveying direction for reading of the document. Thus, when the processing is designated for one of the pair of front and back scan images Pa, Pb, the other scan image can also be processed appropriately, eliminating a need for the user to designate processings respectively for the scan images Pa, Pb. Therefore, the pair of front and back scan images Pa, Pb can be easily and accurately edited.

Also, in the image editing program 114*b* in the present embodiment, when the set binding direction and the document conveying direction for reading of the document are perpendicular to each other, the CPU 111 rotates the scan data representative of the even-numbered page 180 degrees among the scan data received from the MFP 1. Thus, the scan images Pa, Pb whose up and down directions coincide with each other can be displayed on the edit screen 120, allowing the user to easily perform the editing operation for the scan images Pa, Pb.

Also, in the image editing program 114*b* in the present embodiment, the pair of front and back scan images Pa, Pb are displayed next to each other on the edit screen 120 and updated to processed images each time when the processing such as the margin deleting processing is executed. Thus, the user can visually check the processings executed for the pair of front and back scan images Pa, Pb.

There will be next explained a second embodiment with reference to FIG. 18. In the above-described first embodiment, the scan data representative of the even-numbered page whose binding setting is the short-side binding is rotated 180 degrees according to the image editing program 114*b* in the PC 100 among the scan data received from the MFP 1. However, in the second embodiment, the scan data representative of the even-numbered page whose binding setting is the short-side binding is rotated 180 degrees in the MFP 1. It is noted that the same reference numerals as used in the first embodiment are used to designate the corresponding elements of this second embodiment, and an explanation of which is dispensed with.

FIG. 18 is a flow chart illustrating a scan processing in the second embodiment. Like the scan processing in the above-described first embodiment, the scan processing in the second embodiment is started when the scan command is received by the MFP 1 from the PC 100 using the scanner driver 114a or when the execution of the scanning function is selected on the MTP 1.

As illustrated in FIG. 18, in the scan processing in the second embodiment, when the binding setting included in the setting information stored in the setting memory 13a indicates the short-side binding after S206 (S810: Yes), the CPU 11 at S802 rotates the scan data representative of the even-numbered page 180 degrees among the scan data, and the flow goes to S207. It is noted that, in the present embodiment, the processing at S305 is omitted from the scan-data editing processing (see FIG. 13) executed in the PC 100.

In the second embodiment, among the scan data obtained by scanning of the scanner 16, the MTP 1 rotates the scan data representative of the even-numbered page 180 degrees and then transmits the scan data to the PC 100. Also in this embodiment, the scan images Pa, Pb whose up and down directions coincide with each other can be displayed on the edit screen 120 according to the image editing program 114b, allowing the user to easily perform the editing operation for the scan images Pa, Pb.

In each of the above-described embodiments, the PC 100 is one example of an information processing apparatus and an image editing apparatus. The CPU 111 is one example of a computer. The RAM 113 is one example of a storage device. The LCD 116 is one example of a display device. The image editing system 500 is one example of an image editing system. The scanner 16 is one example of an image reading unit. The MFP 1 is one example of an image reading device.

The processing at S301 or the CPU 111 that executes this processing is one example of an image-data obtainer or an image-data obtaining device. The processings at S402, S502, S602, S702 or the CPU 111 that executes these processings is one example of a processing-command receiver. The processings at S404, S408, S409, S411, S412, S504, S508, S509, S511, S512, S604, S608, S609, S611, S612, S704, S707, S708 or the CPU 111 that executes these processings is one example of an image processor. The processing at S301 or the CPU 111 that executes this processing is one example of a binding-information obtainer or a binding-information obtaining device. The processing at S305 or the CPU 11 that executes this processing is one example of a rotation processor. The processing at S301 or the CPU 111 that executes this processing is one example of a storage controller. The processing at S722 or the CPU 111 that executes this processing is one example of a data-deletion-command receiver. The processing at S723 or the CPU 111 that executes this processing is one example of an image-data deleter or an image-data deleting device. The processing at S724 or the CPU 111 that executes this processing is one example of a page-number updater or a page-number updating device. The processing at S307 or the CPU 111 that executes this processing is one example of a display controller.

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

For example, while the image editing program 114b is installed on the PC 100 in the above-described embodiments, the image editing program 114b may be installed on the MFP 1. Also, while the PC 100 on which the image editing program 114b is installed is one example of the image editing apparatus in the above-described embodiments, a device with the image editing program 114b and capable of reading the document like the MFP 1 is also one example of the image editing apparatus. Also, while the image editing system 500 including the MFP 1 capable of reading the document and the PC 100, provided separately from the MFP1, on which the image editing program 114b is installed is one example of the image editing system in the above-described embodiments, a device with the image editing program 114b and capable of reading the document like the MFP 1 is also one example of the image editing system. Also, while the MFP 1 having the scanning function and other functions is one example of the image reading device in the above-described embodiments, a scanner device having only the scanning function is also one example of the image reading device.

Also, while the pair of front and back scan data are obtained using the scanner 16 provided with the two reading units 16a1, 16a2 in the above-described embodiments, a scanner provided with one reading unit may be used. In this case, for example, the document being conveyed is turned upside down, and during this conveyance the one reading unit reads the front and back faces of the document to obtain the pair of front and back scan data.

Also, while the scan processing in FIG. 12 or 18 is started when the scan command is received by the MFP 1 from the PC 100 using the scanner driver 114a or when the execution of the scanning function is selected on the MFP 1 in the above-described embodiments, the MFP 1 may be configured such that the MFP 1 checks the presence or absence of the scan command of the PC 100 using polling, and when the scan command is detected, the scan processing in FIG. 12 or 18 is started.

Also, it has been explained that the processings indicated by the flow charts in FIGS. 14-16 are applied in the case where the scan data received by the PC 100 from the MFP 1 is the scan data whose document conveying direction coincides with the long-side extending direction. Nevertheless, where the CPU is designed to determine whether the binding setting is the short-side binding or not at S407, S410, S507, S510, S607, and S610, the processings indicated by the flow charts in FIGS. 14-16 can be applied to the scan data whose document conveying direction coincides with the short-side extending direction. Also, where information indicating the document conveying direction is included in the setting information received from the MFP 1, it is possible to obtain an image editing program that can be applied to both of the case where the document conveying direction coincides with the long-side extending direction and the case where the document conveying direction coincides with the short-side extending direction.

Also, in the above-described embodiments, when the front and back faces of the document are scanned, the CPU 11 stores values each representing an ordinal number of acquisition of corresponding image data, into the header area D2 of each scan data, as the obtained-page number 51 and the current-page number 52. Nevertheless, the MFP 1 may be configured such that the obtained-page number 51 and the current-page number 52 are not stored into the header area D2 upon the scanning, and when the PC 100 receives the scan data from the MFP 1, the values each representing an ordinal number of acquisition of corresponding image data are stored in the order of the receipt as the obtained-page number 51 and the current-page number 52.

Also, in the above-described first embodiment, when the set binding direction and the document conveying direction for reading of the document are perpendicular to each other, the CPU 111 of the PC 100 rotates the scan data representative of the even-numbered page 180 degrees among the scan data received from the MFP 1. Also, in the above-described second embodiment, when the set binding direction and the document conveying direction for reading of the document are perpendicular to each other, the CPU 11 of the MFP 1 rotates the scan data representative of the even-numbered page 180 degrees among the scan data obtained by scanning of the scanner 16. Instead of these configuration, among the pair of front and back scan data, the scan data representative of the even-numbered page whose up and down direction is opposite that of the odd-numbered page may be rotated 180 degrees in response to the designation by the user.

Also, in the above-described embodiments, when the set binding direction and the document conveying direction for reading of the document are perpendicular to each other, the CPU 111 of the PC 100 or the CPU 11 of the MFP 1 rotates the scan data representative of the even-numbered page 180 degrees among the scan data received from the MFP 1 or the scan data obtained by scanning of the scanner 16. Nevertheless, the scan data representative of the odd-numbered page may be rotated 180 degrees.

Also, in the above-described scan-data editing processing (see FIG. 13), in the case where neither the scan data whose obtained-page number 51 is 2i−1 nor the scan data whose obtained-page number 51 is 2i exists due to their deletion at S306, the edit screen 120 containing no scan images is displayed. Nevertheless, the next pair of front and back scan images may be displayed in such a case.

Also, in the above-described scan-data editing processing, when the CPU 111 receives the command for executing the image processing such as the margin deletion, the image movement, the rotation-center movement, and the image rotation, the CPU 111 executes the processing (at S321, S322, S323, or S324) corresponding to the received command. Instead of this configuration, in a case where the command of executing the image processing for the front face or the back face is designated in advance by the user, the normal editing processing (S327) may be executed when the CPU 111 receives the command for the image processing such as the margin deletion, the image movement, the rotation-center movement, and the image rotation. In this case, for example, when the positive decision is made at S310, S311, S312, or S313 in the scan-data editing processing, the CPU 111 determines whether the command of executing the image processing for the front face or the back face is designated in advance by the user or not, and when the command is designated in advance, the normal editing processing (S327) is executed. On the other hand, when the command is not designated, the CPU 111 executes the processing corresponding to the received command (S321, S322, S323, S324), for example.

Also, in the above-described embodiments, the margin deleting processing, the image moving processing, the rotation-center moving processing, and the rotating processing can be executed for the scan data in the scan-data editing processing (see FIG. 13) executed according to the image editing program 114b, but an image processing that differs from these processings can be executed. In this case, when the negative decision is made at S314, and the CPU 111 determines that the image processing that differs from the processings is designated in the scan-data editing processing, the normal editing processing (S327) is executed, for example.

While the binding information referred at S304 in the scan-data editing processing (see FIG. 13) can be set by the user (that is, the binding information is settable information) in the above-described first embodiment, the binding information may be a predetermined faxed value. In this configuration, in a case where the MFP 1 is configured to convey the document only in a predetermined direction (i.e., the long-side extending direction or the short-side extending direction), when a binding direction indicated by the binding information having the predetermined fixed value coincides with the document conveying direction, the processings at S304, S305 are omitted. Also, the processings at S407, S409, S410, S412 in FIG. 14, the processings at S507, S509, S510, S512 in FIG. 15, and the processings at S607, S609, S610, S612 in FIG. 16 are omitted.

On the other hand, when the binding direction indicated by the binding information having the predetermined fixed value is a direction perpendicular to the document conveying direction, the processing at S304 is omitted (noted that the processing at S305 is executed). Also, the processings at S407, S408, S410, S411 in FIG. 14, the processings at S507, S508, S510, S511 in FIG. 15, and the processings at S607, S608, S610, S611 in FIG. 16 are omitted.

Likewise, the binding information referred at S801 in the scan processing in the above-described second embodiment (see FIG. 18) can be a predetermined fixed value. In such a configuration, in a case where the MFP 1 is configured to convey the document only in a predetermined direction, when the binding direction indicated by the binding information having the predetermined fixed value coincides with the document conveying direction, the processings at S801, S802 are omitted. On the other hand, when the binding direction indicated by the binding information having the predetermined fixed value is the direction perpendicular to the document conveying direction, the processing at S801 is omitted (noted that the processing at S802 is executed).

What is claimed is:

1. An image editing apparatus, comprising:
   an image-data obtainer configured to obtain: first-face image data that is created by reading a first face of a document; and second-face image data that is created by reading a second face of the document which is on a back of the first face, the first-face image data being as first target data, the second-face image data being as second target data;
   a binding-direction obtainer configured to obtain a binding direction in which a binding portion of the document extends;
   an image processor configure to execute:
   a first image displaying processing in which a first image corresponding to the first target data and a second image corresponding to the second target data are displayed next to each other on a display;
   a receiving processing in which an input indicating a first moving amount and a first moving direction for the first image is received;
   a first changing processing in which the first target data is changed such that a position of the first image is moved based on the first moving amount and the first moving direction;
   a determination processing in which a second moving direction for the second image is determined based on the first moving direction and a symmetry axis that is extending through a center of the first image and extending in a direction along the binding direction of the document, the second direction is symmetrical to the first direction with respect to the symmetry axis;
   a second changing processing in which the second target data is changed such that a position of the second image is moved based on the first moving amount and the second moving direction;
   a second image displaying processing in which the first image and the second image are displayed on the display in the basis of the changed first target data and the changed second target data respectively.

2. The image editing apparatus according to claim 1, wherein the image processor is configured to execute the first moving processing in which a parallel movement of the first image by a parallel moving amount as the first moving amount in the first moving direction is caused, and
wherein the image processor is configured to execute the second moving processing in which a parallel movement of the second image by the parallel moving amount in the second moving direction is caused.

3. The image editing apparatus according to claim 1, wherein the image processor is configured to execute the first moving processing in which a rotational movement of the first image by a rotational amount as the first moving amount in a first rotational direction as the first moving direction about a set specific rotation center is caused, and
wherein the image processor is configured to execute the second moving processing in which a rotational movement of the second image by the rotational amount in a second rotational direction that is opposite to the first rotational direction as the second moving direction about the set specific rotation center is caused.

4. The image editing apparatus according to claim 1, wherein the image processor is configured to execute the first moving processing in which a first rotation-center movement of the first image by a first rotation-center moving amount as the first moving amount in the first moving direction is caused, the first rotation-center movement being a movement of a rotation center of the first image, and
wherein the image processor is configured to execute the second moving processing in which a second rotation-center movement of the second image by the first rotation-center moving amount in the second moving direction is caused.

5. An image editing apparatus, comprising:
an image-data obtainer configured to obtain: first-face image data that is created by reading a first face of a document; and second-face image data that is created by reading a second face of the document which is on a back of the first face, the first-face image data being as first target data, the second-face image data being as second target data;
a processing-command receiver configured to receive a command for executing a processing for one of the first target data and the second target data as one target data;
an image processor configured, upon receipt of the command by the processing-command receiver, to execute, for the one target data, a processing based on the command received by the processing-command receiver and to execute, for another of the first target data and the second target data as an other target data, a symmetrical processing that is symmetrical to the processing based on the command received by the processing-command receiver with respect to a symmetry axis that is an axis extending through a center of an image corresponding to the one target data and extending in a sub-scanning direction during reading of the document for the creation of the first-face image data and the second-face image data; and
a storage controller configured to store image data obtained by the image-data obtainer, into a storage device,
wherein the processing-command receiver comprises a data-deletion-command receiver configured to receive a data deletion command for commanding deletion of the image data stored in the storage device,
wherein the image editing apparatus further comprises:
a image-data deleter configured to, when the data deletion command is received by the data-deletion-command receiver, delete, from the storage device, image data for which deletion is commanded by the data deletion command;
a page-number updater configured to, when a value related to an ordinal reading number of the image data and a page number of the image data are assigned to the image data and when the image data to which the value and the page number are assigned is deleted by the image-data deleter from the storage device, update a page number assigned to image data that is one of the image data stored in the storage device and that is representative of a page subsequent to a page based on the image data for which the deletion is commanded by the data deletion command; and
a determiner configured to determine, based on the value related to the ordinal reading number, whether there is the other target data that constitutes a pair with the one target data in the document,
wherein, when the determiner determines that there is the other target data that constitutes a pair with the one target data, the image processor processes the one target data and the other target data based on the command received by the processing-command receiver, and
wherein, when the determiner determines that there is not the other target data that constitutes a pair with the one target data, the image processor processes the one target data based on the command received by the processing-command receiver and is inhibited from processing the other target data.

6. An image editing apparatus, comprising:
an image-data obtainer configured to obtain: first-face image data that is image data representative of a first face of a document; and second-face image data corresponding to an image that is obtained by rotating an image being on a second face of the document which is on a back of the first face, ISO degrees about a center of the image being on the second face, the first-face image data being as first target data, the second-face image data being as second target data;
a binding-direction obtainer configured to obtain a binding direction in which a binding portion of the document extends;
an image processor configured to execute:
a first image displaying processing in which a first image corresponding to the first target data and a second image corresponding to the second target data are displayed next to each other on a display;
a receiving processing in which an input indicating a first moving amount and a first moving direction for the first image is received;
a first changing processing in which the first target data is changed such that a position of the first image is moved based on the first moving amount and the first moving direction;
a determination processing in which a second moving direction for the second image is determined based on the first moving direction and a symmetry axis that is extending through a center of the first image and extending in a direction along the binding direction of the document, the second direction is symmetrical to the first direction with respect to the symmetry axis;
a second changing processing in which the second target data is changed such that a position of the second image is moved based on the first moving amount and the second moving direction;

a second image displaying processing in which the first image and the second image are displayed on the display in the basis of the changed first target data and the changed second target data respectively.

7. A non-transitory computer-readable medium storing a program executable by a computer of an image editing apparatus, the program designed to cause the computer function as:
an image-data obtainer configured to obtain: first-face image data that is created by reading a first face of a document; and second-face image data that is created by reading a second face of the document which is on a back of the first face, the first-face image data being as first target data, the second-face image data being as second target data;
a binding-direction obtainer configured to obtain a binding direction in which a binding portion of the document extends;
an image processor configured to execute:
a first image displaying processing in which a first image corresponding to the first target data and a second image corresponding to the second target data are displayed next to each other on a display;
a receiving processing in which an input indicating a first moving amount and a first moving direction for the first image is received;
a first changing processing in which the first target data is changed such that a position of the first image is moved based on the first moving amount and the first moving direction;
a determination processing in which a second moving direction for the second image is determined based on the first moving direction and a symmetry axis that is extending through a center of the first image and extending in a direction along the binding direction of the document, the second direction is symmetrical to the first direction with respect to the symmetry axis;
a second changing processing in which the second target data is changed such that a position of the second image is moved based on the first moving amount and the second moving direction;
a second image displaying processing in which the first image and the second image are displayed on the display in the basis of the changed first target data and the changed second target data respectively, for the one target data, a processing based on the command received by the processing-command receiver and to execute, for another of the first target data and the second target data as an other target data, a symmetrical processing that is symmetrical to the processing based on the command received by the processing-command receiver with respect to a symmetry axis that is an axis extending through a center of an image corresponding to the one target data and extending in a sub-scanning direction during reading of the document for the creation of the first-face image data and the second-face image data.

8. The non-transitory computer-readable medium according to claim 7,
wherein the image processor is configured to execute the first moving processing in which a parallel movement of the first image by a parallel moving amount as the first moving amount in the first moving direction is caused, and
wherein the image processor is configured to execute the second moving processing in which a parallel movement of the second image by the parallel moving amount in the second moving direction is caused.

9. The non-transitory computer-readable medium according to claim 7,
wherein the image processor is configured to execute the first moving processing in which a rotational movement of the first image by a rotational amount as the first moving amount in a first rotational direction as the first moving direction about a set specific rotation center is caused, and
wherein the image processor is configured to execute the second moving processing in which a rotational movement of the second image by the rotational amount in a second rotational direction that is opposite to the first rotational direction as the second moving direction about the set specific rotation center is caused.

10. The non-transitory computer-readable medium according to claim 7,
wherein the image processor is configured to execute the first moving processing in which a first rotation-center movement of the first image by a first rotation-center moving amount as the first moving amount in the first moving direction is caused, the first rotation-center movement being a movement of a rotation center of the first image, and
wherein the image processor is configured to execute the second moving processing in which a second rotation-center movement of the second image by the first rotation-center moving amount in the second moving direction is caused.

11. A non-transitory computer-readable medium storing a program executable by a computer of an image editing apparatus, the program designed to cause the computer function as:
an image-data obtainer configured to obtain: first-face image data that is created by reading a first face of a document; and second-face image data that is created by reading a second face of the document which is on a back of the first face, the first-face image data being as first target data, the second-face image data being as second target data;
a processing-command receiver configured to receive a command for executing a processing for one of the first target data and the second target data as one target data;
an image processor configured, upon receipt of the command by the processing-command receiver, to execute, for the one target data, a processing based on the command received by the processing-command receiver and to execute, for another of the first target data and the second target data as an other target data, a symmetrical processing that is symmetrical to the processing based on the command received by the processing-command receiver with respect to a symmetry axis that is an axis extending through a center of an image corresponding to the one target data and extending in a sub-scanning direction during reading of the document for the creation of the first-face image data and the second-face image data,
wherein the program is designed to cause the computer further function as a storage controller configured to store image data obtained by the image-data obtains:, into a storage device,
wherein the processing-command receiver comprises a data-deletion-command receiver configured to receive a data deletion command for commanding deletion of the image data stored in the storage device, wherein the program is designed to cause the computer further function as:

a image-data deleter configured to, when the data deletion command is received by the data-deletion-command receiver, delete, from the storage device, image data, for which deletion is commanded by the data deletion command;

a page-number updater configured to, when a value related to an. ordinal reading number of the image data and a page number of the image data are assigned to the image data and when, the image data to which the value and the page number are assigned is deleted by the image-data deleter from the storage device, update a page number assigned to image data that is one of the image data stored in the storage device and that is representative of a page subsequent to a page based on the image data for which the deletion is commanded by the data deletion command; and a determiner configured to determine, based on the value related to the ordinal reading number, whether there is the other target data that constitutes a pair with the one target data in the document, wherein, when the determiner determines that there is the other target data that constitutes a pair with the one target data, the image processor processes the one target data and the other target data based on the command received by the processing-command receiver and is inhibited from processing the other target data.

* * * * *